US012577163B2

(12) United States Patent (10) Patent No.: US 12,577,163 B2
Kincaid et al. (45) Date of Patent: Mar. 17, 2026

(54) HIGH SOLIDS, SPRAYABLE SETTING TYPE JOINT COMPOUND

(71) Applicant: KNAUF GIPS KG, Iphofen (DE)

(72) Inventors: Tyler Kincaid, Wheaton, IL (US);
Rafael Bury, Wheeling, IL (US);
Joseph W. Schlude, South Barrington,
IL (US); Naveen Punati, Lake Zurich,
IL (US)

(73) Assignee: KNAUF GIPS KG, Iphofen (DE)

( * ) Notice: Subject to any disclaimer, the term of this patent is extended or adjusted under 35 U.S.C. 154(b) by 543 days.

(21) Appl. No.: 17/527,756

(22) Filed: Nov. 16, 2021

(65) Prior Publication Data

US 2022/0267214 A1 Aug. 25, 2022

Related U.S. Application Data

(60) Provisional application No. 63/151,341, filed on Feb. 19, 2021.

(51) Int. Cl.
| | |
|---|---|
| *C04B 28/00* | (2006.01) |
| *C04B 14/28* | (2006.01) |
(Continued)

(52) U.S. Cl.
CPC ............ *C04B 28/146* (2013.01); *C04B 14/28* (2013.01); *C04B 22/16* (2013.01); *C04B 2103/12* (2013.01); *C04B 2103/22* (2013.01); *C04B 2103/44* (2013.01); *C04B 2103/54* (2013.01); *C04B 2103/60* (2013.01); *C04B 2111/00172* (2013.01); *C04B 2111/00689* (2013.01)

(58) Field of Classification Search
None
See application file for complete search history.

(56) References Cited

U.S. PATENT DOCUMENTS

| | | | |
|---|---|---|---|
| 4,454,267 A | 6/1984 | Williams | |
| 4,525,388 A | 6/1985 | Rehder et al. | |
(Continued)

FOREIGN PATENT DOCUMENTS

| | | | | |
|---|---|---|---|---|
| EP | 1403227 A1 | 3/2004 | | |
| WO | WO-2014108434 A1 * | 7/2014 | ........... | C04B 28/146 |

OTHER PUBLICATIONS

WO-2014108434-A1, English translation (Year: 2014).*
(Continued)

*Primary Examiner* — Stefanie J Cohen
(74) *Attorney, Agent, or Firm* — Vorys, Sater, Seymour and Pease LLP; Pradip Sahu; Maryellen Feehery Hank

(57) ABSTRACT

A high solids, sprayable, fast drying, ready-mixed setting-type joint compound comprising a blend of a joint compound mixture comprising: joint compound mixture ingredients comprising: calcium sulfate hemihydrate (e.g. US Gypsum's HYDROCAL C-Base), a chelating agent, and water; and an activator mixture, wherein the activator mixture comprises: activator mixture ingredients comprising: inert filler, set accelerator, and water, wherein a weight ratio of joint compound mixture:activator mixture is 1:1 to 100:1, wherein the activator mixture viscosity is the same as the joint compound mixture viscosity plus or minus 50 percent, and wherein the joint compound has about 55 to about 80 wt. % solids and a viscosity of 2,500-28,000 cps.

14 Claims, 7 Drawing Sheets

(51) Int. Cl.

| | |
|---|---|
| *C04B 22/16* | (2006.01) |
| *C04B 28/14* | (2006.01) |
| *C04B 103/12* | (2006.01) |
| *C04B 103/22* | (2006.01) |
| *C04B 103/44* | (2006.01) |
| *C04B 103/54* | (2006.01) |
| *C04B 103/60* | (2006.01) |
| *C04B 111/00* | (2006.01) |

(56) References Cited

U.S. PATENT DOCUMENTS

| | | | |
|---|---|---|---|
| 4,661,161 A | 4/1987 | Jakacki et al. | |
| 5,746,822 A | 5/1998 | Espinoza et al. | |
| 5,779,786 A | 7/1998 | Patel | |
| 6,228,163 B1 | 5/2001 | Espinoza et al. | |
| 6,355,099 B1 | 3/2002 | Immordino et al. | |
| 6,379,458 B1 | 4/2002 | Immordino et al. | |
| 6,406,537 B1 * | 6/2002 | Immordino | C04B 28/146 |
| | | | 106/782 |
| 6,545,066 B1 * | 4/2003 | Immordino, Jr. | C04B 16/082 |
| | | | 106/602 |
| 6,716,906 B1 | 4/2004 | Houman et al. | |
| 6,805,741 B1 | 10/2004 | Liu et al. | |
| 7,588,634 B2 | 9/2009 | Lynn et al. | |
| 7,695,561 B2 | 4/2010 | Cox et al. | |
| 7,754,006 B2 | 7/2010 | Liu et al. | |
| 7,759,416 B2 | 7/2010 | Liling | |
| 10,669,215 B2 | 6/2020 | Stevens et al. | |
| 2004/0187741 A1 * | 9/2004 | Liu | C04B 28/145 |
| | | | 106/781 |
| 2008/0000918 A1 * | 1/2008 | Bruno | E04F 21/02 |
| | | | 220/695 |
| 2008/0148996 A1 * | 6/2008 | Cox | C04B 11/268 |
| | | | 106/705 |
| 2008/0229981 A1 | 9/2008 | Liu et al. | |
| 2009/0208392 A1 | 8/2009 | Klus | |
| 2017/0233293 A1 * | 8/2017 | Ayambem | C04B 24/36 |
| | | | 156/326 |
| 2019/0135697 A1 | 5/2019 | Rosenthal et al. | |

OTHER PUBLICATIONS

Written Opinion and International Search report of corresponding PCT application No. PCT/IB2022/051421 mailed Jun. 13, 2022.

Machine translation of WO 2014/108434A1, from European Patent Office, URL:<https://worldwide.espacenet.com/patent/search/family/049958449/publication/WO2014108434A1?q=WO2014108434A1>, retrieved from the Internet Aug. 12, 2024.

* cited by examiner

Dryness Curve
76°F/43%RH
45-mil Thickness (Wallboard)

Moisture Removed (%)

100%

80%

60%

40%

20%

0%

0:00    1:00    2:00    3:00    4:00    5:00    6:00    7:00    8:00

Hours

········· Compound A

═ ═ ═ ═ Compound B

▬ · ▬ Compound C

━━━ Compound D

═════ Water

HIGH SOLIDS, SPRAYABLE SETTING TYPE JOINT COMPOUND

This application claims the benefit of U.S. Provisional Application Ser. No. 63/151,341 filed Feb. 19, 2021, which is herein incorporated by reference.

FIELD OF THE INVENTION

The present invention relates to a high solids, sprayable ready-mixed setting-type joint compound. This setting-type joint compound offers a ready-to-use consistency to avoid a prolonged finishing time. The invention provides a sprayable product that will set (with a hard and durable finish), once activated with the activator mixture compound, in addition to drying faster due to the high solids content. Thus, the joint compound has a sprayable consistency, will not sag on the wall, and will dry fast.

BACKGROUND OF THE INVENTION

In the construction of buildings, one of the most common building elements is gypsum wallboard, often known as drywall or gypsum paneling, used in the construction of walls and/or ceilings. The board may be composed of any of a variety of materials, including but not limited to, cementitious materials such as, for example, cement or gypsum. Walls made from gypsum wallboard are traditionally constructed by affixing the panels to wood studs or metal framing, and treating the joints between adjoining panels with a specially prepared adhesive called a joint compound. Gypsum panels easily accommodate walls that are unusual in size and can be shaped around structural elements such as beams or pipes. The side edges of the drywall panels are tapered, thus allowing the joint compound to be applied to the seam, between adjoining panels, in such a way that a monolithic surface is created when finished. It is well known in the art that finishing a joint between boards involves three steps. First, a thin layer of joint compound is applied to the boards over the joint, and a permeable paper or fiberglass tape is embedded into it. Next, a second coat of joint compound is applied over the embedded joint tape. The second coat of joint compound typically extends approximately two inches beyond the edges of the joint tape. Finally, a third coat of joint compound is applied over the first two coats, where the third coat typically extends even further out from the edges of the joint tape. Both the second and third coat may be subsequently lightly sanded upon drying. Joint compounds are also used to make repairs of defects, such as uneven surfaces, holes, depressions, gaps, dents, and other imperfections including those around electrical boxes, piping and duct work, as well as corners created by the intersection of drywall boards. Joint compounds are also spray applied and/or hand applied over drywall, concrete, brick and mortar, textured substrates and other conventional substrates.

A variety of joint compounds have been sold commercially, as well as described in printed publications and patents. Generally, such compound compositions are referred to as either "drying-type" joint compounds or "setting-type" joint compounds and are made up of a filler (e.g., calcium carbonate, calcium sulfate hemihydrate, or calcium sulfate dihydrate), thickener, preservative, and a binder, as well as various other additives.

There are several categories of joint compounds. Drying type compounds cure through the evaporation of water, whereas setting type joint compounds chemically react with water during the curing process. Setting type joint compounds typically use calcium sulfate hemihydrate ($CaSO_4 \cdot \frac{1}{2}H_2O$), also known as stucco, calcined gypsum, plaster, or Plaster of Paris, as a base. When water is added to the setting type powder, it reacts with the calcium sulfate hemihydrate via a hydration reaction to form an interlocking matrix of calcium sulfate dihydrate crystals. The interlocking crystal matrix gives the compound increased strength. Once completed, a dry, relatively hard cementitious material remains. The benefit of a setting type joint compound over a drying type is an independence from having to wait for the joint compound to be completely dry prior to further finishing, as well as less shrinkage and cracking, and a higher overall strength of the finished joint. The rehydration of calcium sulfate hemihydrate normally takes place over a fairly short period of time. Therefore, setting-type compound compositions are typically supplied to the job site in the form of a dry powder to which the user then adds a sufficient amount of water to give the compound a suitable consistency to be applied to the wall.

Another type of joint compound combines the setting action of a calcium sulfate hemihydrate based compound with the ease of use of a ready mixed compound. The properties of a ready mixed setting type joint compound with an a or p form of the calcium hemihydrate are taught in U.S. Pat. No. 5,746,822, incorporated herein by reference.

In U.S. Pat. No. 6,355,099, a composition including specific forms of calcium sulfate hemihydrate, an internal binder and an ethylene/vinyl acetate copolymer adhesive binder may be sprayed with a spray gun.

Sealant compounds with mineral fillers, hydrophobic expanded perlite and binders are taught in U.S. Pat. No. 7,759,416.

Set accelerators comprising mixtures of ground calcium sulfate dehydrate and zinc sulfate material, with total solids of not more than 55% by weight, are described in U.S. Pat. No. 6,379,458.

Set preventers, also known as set retarders or retarders, are described in the art for example in U.S. Pat. No. 10,669,215, which teaches a calcium-free set preventing agent and a joint compound base which is free of calcium carbonate. In U.S. Pat. No. 6,228,163, TSSP is taught as a set preventer in a two part joint compound which is clay-free, and zinc sulfate is an accelerator. In U.S. Pat. No. 6,805,741, there is a ready-mixed composition with a set preventer comprising a polyacrylic acid and/or salt thereof.

SUMMARY OF THE INVENTION

A high solids, sprayable, fast drying, ready-mixed setting-type joint compound comprising a blend of
(A) a joint compound mixture comprising:
  (a) joint compound mixture ingredients comprising in weight percent on a dry basis:
    about 20 to about 99 wt. % calcium sulfate hemihydrate in an alpha morphological form having blocky cubic crystal microstructure with a D50 average particle size of about 15 to 50 microns, for example 15 to 20 microns or 20 to 50 microns,
    about 0-4 wt. % thickening agent,
    about 0-2 wt. % set retarder,
    about 0.05-5 wt. % chelating agent, wherein the chelating agent is selected from tetra sodium pyrophosphate or tetra potassium pyrophosphate,
    about 0-2 wt. % preservative,
    optionally about 0-5 wt. % second chelating agent,
    optionally about 0-80 wt. % filler, and optionally about 0-5 wt. % binder,
and (b) joint compound mixture water, wherein weight ratio of the joint compound mixture ingredients to the joint compound mixture water is within a range of 9:1 to 3:2, and (B) an activator mixture, wherein the activator mixture comprises:

(a) activator mixture ingredients comprising in weight percent on a dry basis:

inert filler at about 0-95 wt. % of the activator mixture ingredients, set accelerator at about 5-99 wt. % of the activator mixture ingredients, thickening agent at about 0-4 wt. % of the activator mixture ingredients, preservative at about 0-2 wt. % of the activator mixture ingredients, and (b) activator mixture water, wherein weight ratio of the activator mixture ingredients to the activator mixture water is within a range of 9:1 to 1:1, wherein a weight ratio of joint compound mixture: activator mixture is 1:1 to 100:1, wherein the activator mixture viscosity is the same as the joint compound mixture viscosity plus or minus 50%, preferably plus or minus 20%, most preferably plus or minus 10%, In other words the activator mixture viscosity is within a range defined by the value of the joint compound mixture viscosity+/−50%, preferably +/−10% wherein the joint compound mixture viscosity is between 2,500-28,000 cps, wherein the activator mixture viscosity is between 2,500-28,000 cps, more preferably about 4,000-5,600 cps, wherein the joint compound viscosity is between 2,500-28,000 cps, more preferably about 4,000-5,600 cps and wherein the joint compound has about 55 to about 88 wt. % solids, typically 60 to 88 wt. % solids, wherein the joint compound mixture has about 55 to about 88 wt. % solids, typically 60 to 88 wt. % solids, wherein the activator mixture has about 55 to about 88 wt. % solids typically 60 to 88 wt. % solids.

A system for making a joint compound comprising a joint compound mixture and an activator mixture, said joint compound mixture being mixable with the activator mixture;

(A) wherein the joint compound mixture comprises (a) joint compound mixture ingredients comprising in weight percent on a dry basis:

about 20 to about 99 wt. % calcium sulfate hemihydrate in an alpha morphological form having blocky cubic crystal microstructure with a D50 average particle size of about 15 to 50 microns, for example 15 to 20 microns or 20 to 50 microns, about 0-4 wt. % thickening agent, about 0-2 wt. % set retarder, about 0.05-5 wt. % chelating agent, wherein the chelating agent is selected from tetra sodium pyrophosphate or tetra potassium pyrophosphate, about 0-2 wt. % preservative, optionally about 0-5 wt. % second chelating agent, optionally about 0-80 wt. % filler, and optionally about 0-5 wt. % binder,
and (b) joint compound mixture water, wherein weight ratio of the joint compound mixture ingredients to the joint compound mixture water is within a range of 9:1 to 3:2, and (B) wherein the activator mixture comprises:

(a) activator mixture ingredients comprising in weight percent on a dry basis:

inert filler at about 0-95 wt. % of the activator mixture ingredients, set accelerator at about 5-99 wt. % of the activator mixture ingredients, thickening agent at about 0-4 wt. % of the activator mixture ingredients, and preservative at about 0-2 wt. % of the activator mixture ingredients, and (b) activator mixture water, wherein weight ratio of the activator mixture ingredients to the activator mixture water is within a range of 9:1 to 1:1, wherein a weight ratio of joint compound mixture: activator mixture is 1:1 to 100:1, wherein the activator mixture viscosity is the same as the joint compound mixture viscosity plus or minus 50%, preferably plus or minus 20%, most preferably plus or minus 10%, wherein the joint compound mixture viscosity is between 2,500-28,000 cps, wherein the activator mixture viscosity is between 2,500-28,000 cps, wherein the joint compound viscosity is between 2,500-28,000 cps, and wherein the joint compound has about 55 to about 88 wt. % solids, wherein the joint compound mixture has about 55 to about 88 wt. % solids, wherein the activator mixture has about 55 to about 88 wt. % solids.

A method of dispersing joint compound comprising mixing a joint compound mixture and an activator mixture and spraying the joint compound through a nozzle on a spray gun, (A) wherein the joint compound mixture comprises (a) joint compound mixture ingredients comprising in weight percent on a dry basis:

about 20 to about 99 wt. % calcium sulfate hemihydrate in an alpha morphological form having blocky cubic crystal microstructure with a D50 average particle size of about 15 to 50 microns, for example 15 to 20 microns or 20 to 50 microns, about 0-4 wt. % thickening agent, about 0-2 wt. % set retarder, about 0.05-5 wt. % chelating agent, wherein the chelating agent is selected from tetra sodium pyrophosphate or tetra potassium pyrophosphate, about 0-2 wt. % preservative, optionally about 0-5 wt. % second chelating agent, optionally about 0-80 wt. % filler, and optionally about 0-5 wt. % binder,
and (b) joint compound mixture water, wherein weight ratio of the joint compound mixture ingredients to the water is within a range of 9:1 to 3:2, and (B) wherein the activator mixture comprises:

(a) activator mixture ingredients comprising in weight percent on a dry basis:

inert filler at about 0-95 wt. % of the activator mixture ingredients, set accelerator at about 5-99 wt. % of the activator mixture ingredients, thickening agent at about 0-4 wt. % of the activator mixture ingredients, and preservative at about 0-2 wt. % of the activator mixture ingredients, and (b) activator mixture water, wherein weight ratio of the activator mixture ingredients to the activator mixture water is within a range of 9:1 to 1:1, wherein a weight ratio of joint compound mixture:activator mixture is 1:1 to 100:1, wherein the activator mixture viscosity is the same as the joint compound mixture viscosity plus or minus 50%, preferably plus or minus 20%, most preferably plus or minus 10%, wherein the joint compound mixture viscosity is between 2,500-28,000 cps, wherein the activator mixture viscosity is between 2,500-28,000 cps, wherein the joint compound viscosity is between 2,500-28,000 cps, wherein the joint compound has about 55 to about 88 wt. % solids, wherein the joint compound mixture has about 55 to about 88 wt. % solids, and wherein the activator mixture has about 55 to about 88 wt. % solids.

Other advantages, benefits and aspects of the invention are discussed below, are illustrated in the accompanying figures, and will be understood by those of skill in the art from the more detailed disclosure below.

As used in the present specification at the very least, and not as an attempt to limit the application of the doctrine of equivalents to the scope of the claim, each numerical parameter modified by the term "about" should at least be construed in light of the number of reported significant digits and by applying ordinary rounding techniques.

DETAILED DESCRIPTION OF THE INVENTION

This invention relates generally to a high solids, sprayable ready-mixed setting type joint compound. This joint compound has a lower viscosity with higher solids than the prior art and can flow through a sprayer but still has enough structure so that it does not flow off the wall.

The present invention provides a setting-type joint compound which is a blend of joint compound mixture and activator mixture with high solids of about 66 to about 78 wt. % solids, wherein the joint compound mixture and the activator mixture have similar viscosities.

For example, the sprayable, setting-type joint compound may have a weight ratio of joint compound mixture:activator mixture of from 1:1 to 10:1.

The joint compound mixture and the activator mixture have viscosities which are the same within plus or minus 10%.

For purposes of this disclosure, viscosity is that measured with a Brookfield viscometer with a standard Krebs spindle at 75 rpm, for example a Brookfield R/S Plus Rheometer at 75 rpm KU-1030 Spindle.

Vicat set is measured by Vicat set method of 300 g Vicat plunger 1 mm needle (ASTM C472).

Sprayable means the joint compound has a suitable viscosity so it can be simply pumped through conventional spray equipment.

In one embodiment, the joint compound mixture and the activator mixture flow independently until they are introduced into a manifold, which combines the joint compound mixture and the activator mixture together and mixes them in a static mixer in a hose.

In another embodiment, the joint compound mixture flows through a conventional spray gun and the activator mixture is introduced at the nozzle tip of the spray gun.

Solids mean the ingredients which are solid in the joint compound for example: calcium sulfate hemihydrate, attapulgite clay, thickening agent, retarder, chelating agent, optional second chelating agent, preservative, filler, binder, calcium carbonate, and zinc sulfate monohydrate.

High solids means more solids than in conventional joint compounds, from 55 to 88 wt. % solids, preferably from 66 to 78 wt. % solids. The invention contains higher solids than the conventional joint compounds, yet is still sprayable.

Figures 6, 7:
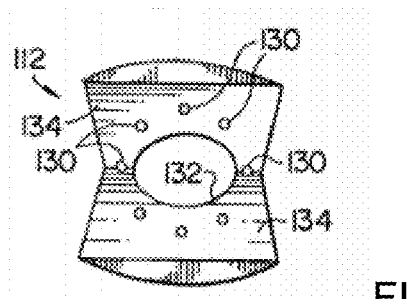
FIG. 6 is an end view of the nozzle used with the applicator of FIG. 5.
FIG. 7 is a dryness curve (76° F./43% relative humidity) for an example with 45-mil thick wallboard.

Fast drying means faster than convention joint compounds dry (dry means sufficiently dry to be ready to move to the next step, for example sanding or painting). The inventive joint compound reaches 80% moisture removal more quickly than a conventional joint compound, for examples as shown in FIG. 7.

A setting-type joint compound comprising a blend of (A) a joint compound mixture comprising:

(a) joint compound mixture ingredients comprising in weight percent on a dry basis:

about 20 to about 99 wt. % calcium sulfate hemihydrate in an alpha morphological form having blocky cubic crystal microstructure with a D50 average particle size of about 15 to 50 microns, for example 15 to 20 microns or 20 to 50 microns, about 0-4 wt. % thickening agent, for example attapulgite clay, about 0-2 wt. % set retarder, about 0.05-5 wt. % chelating agent, wherein the chelating agent is selected from tetra sodium pyrophosphate or tetra potassium pyrophosphate, about 0-2 wt. % preservative, optionally about 0-5 wt. % second chelating agent, optionally about 0-80 wt. % filler, and optionally about 0-5 wt. % binder, and (b) joint compound mixture water, wherein weight ratio of the joint compound mixture ingredients to the joint compound mixture water is within a range of 9:1 to 3:2, and (B) an activator mixture, wherein the activator mixture comprises:

(a) activator mixture ingredients comprising in weight percent on a dry basis:

inert filler, for example dolomitic calcium carbonate, at about 0-95 wt. % of the activator mixture ingredients, set accelerator, for example zinc sulfate monohydrate, at about 5-99 wt. % of the activator mixture ingredients, thickening agent at about 0-4 wt. % of the activator mixture ingredients, preservative at about 0-2 wt. % of the activator mixture ingredients, and (b) activator mixture water, wherein weight ratio of the activator mixture ingredients to the activator mixture water is within a range of 9:1 to 1:1, wherein a weight ratio of joint compound mixture: activator mixture is 1:1 to 100:1, wherein the activator mixture viscosity is the same as the joint compound mixture viscosity plus or minus 50%, preferably plus or minus 20%, most preferably plus or minus 10%, wherein the joint compound mixture viscosity is between 2,500-28,000 cps, wherein the activator mixture viscosity is between 2,500-28,000 cps, wherein the joint compound viscosity is between 2,500-28,000 cps, and wherein the joint compound has about 55 to about 88 wt. % solids, wherein the joint compound mixture has about 55 to about 88 wt. % solids, and wherein the activator mixture has about 55 to about 88 wt. % solids.

As mentioned above, the activator mixture viscosity is the same as the joint compound mixture viscosity plus or minus 50%, preferably plus or minus 20%, most preferably plus or minus 10%. In other words, the activator mixture viscosity is within a range of +/−50% of the joint compound mixture viscosity. For example, if the joint compound mixture viscosity is 10,000 cps, then the activator mixture viscosity in a range of +/−50% of the joint compound mixture viscosity is in a range of 5,000 to 15,000 cps.

However, the viscosity range for the activator mixture will remain in the specified overall range for the activator mixture viscosity. For example, if the activator mixture is specified to have a viscosity between 2,500-28,000 cps and the joint compound mixture viscosity is 20,000 cps, then the activator mixture viscosity in a potential range of +/−50% of the joint compound mixture viscosity is actually a range of 10,000 to 28,000 cps.

One embodiment includes the joint compound mixture has a viscosity of about 4,000-5,600 cps and the activator mixture has a viscosity of about 4,000-5,600 cps.

One embodiment of the joint compound has a Vicat set-time of 23-29 minutes.

The present invention provides a sprayable setting-type joint compounds comprising a joint compound mixture and an activator mixture, wherein the joint compound mixture comprises calcium sulfate hemihydrate in an alpha morphological form having blocky cubic crystal microstructure with a D50 average particle size of about 15 to 50 microns, for example 15 to 20 microns or 20 to 50 microns and the activator mixture comprises a set accelerator. The joint compound has about 55 to 88 wt. %, more preferably 66 to about 78 wt. % solids. The joint compound's viscosity is between 2,500-28,000 cps, preferably between 10,000-18, 000 cps. The joint compound mixture's viscosity is between 2,500-28,000 cps, preferably between 10,000-18,000 cps. The activator mixture's viscosity is between 2,500-28,000 cps, preferably between 10,000-18,000 cps.

At least 80 wt. % of the calcium sulfate hemihydrate is in an alpha morphological form having blocky cubic (as opposed to rod-like) crystal microstructure typically made by autoclaving a gypsum slurry, for example made according to U.S. Pat. No. 7,588,634 herein incorporated by reference, (a typical example of which is HYDROCAL C-Base brand calcium sulfate hemihydrate by United States Gypsum Company) with an average particle size of about 15 to about 20 microns, typically about 17 microns. By blocky cubic structure, the majority of the particles typically have a length to width aspect ratio, for example, less than 2:1, more typically less than 1.5:1. By rod-like structure, the majority of the particles typically have a length to width aspect ratio, for example, of 2:1 or greater.

The invention may be a method of making the high solids concentration sprayable joint compound. The invention may be the method of using the high solids concentration joint compound by spraying the joint compound through a nozzle, for example on a spray gun.

In the prior art, the activator mixture for setting a ready-mixed setting type compound comes in two physical states (powder or liquid). The limiting factor for a powdered activator when attempting to mix and spray is the powder cannot be easily pumped or efficiently mixed with the compound. A limiting factor of a liquid activator is it changes the viscosity of the product significantly (since the liquid activator is of similar to viscosity of water), increasing the setting time, drying time, and surface strength.

This invention relates to the development of a compounded activator mixture that achieves similar viscosity as ready-mixed setting type joint compound which can be easily pumped, mixed, and sprayed on a wall without impacting product viscosity.

The activator mixture and the joint compound mixture are mixed in the present invention.

Because of this similarity in viscosities by using the activator mixture of the present invention, the product's spray viscosity is ultimately un-changed once activated, allowing for faster drying and sag resistance once sprayed. In addition, the activator mixture can be pumped at any ratio 1:1 to 100:1 (joint compound mixture:activator mixture), preferably 1:1 to 50:1, more preferably 1:1 to 25:1, more preferably 1:1 to 10:1, without affecting the viscosity of the product. This offers benefits to choose a custom set time. Pumps currently available on the market are often 1:1 ratios for a 2-part systems. Using a prior art activator solution, the 1:1 ratio would reduce the viscosity of the product so much it wouldn't be able to hold up on the wall since the viscosity would be too low.

The invented joint compound can accelerate the finishing process versus conventional methods since the joint compound is spray applied at a thick layer and either smooth or sanded. The setting type functionality of the product promotes a hard durable surface that cures within an hour and can be either recoated or sanded faster than with a ready-mixed drying type joint compound which cures as it dries (greater than 8-hours depending on thickness).

High water demand raw materials (e.g. thickening agents, perlites, plaster) are reduced or eliminated in the joint compound. Reducing and/or eliminating these raw materials and selecting a low consistency plaster allows for a low consistency, sprayable joint compound with high solids. Plaster consistency is tested via modified ASTM C472-20

Standard Test Methods for Physical Testing of Gypsum, Gypsum Plasters, and Gypsum Concrete (a drop height of 0.5-1.5 inches was used to achieve a patty of uniform thickness with a diameter of 3.125 inches+ or −0.0625 inch). High consistency alpha hemihydrate is 40-44 cc H2O per 100 g plaster. Low consistency alpha hemihydrate plaster is 30-40, preferably 30-39, preferably 31-38, more preferably 31-36 cc H2O per 100 g plaster. The upper limit is typically 36, 38, 39 or 40. The lower limit is typically 30 or 31. Plaster means a calcined sulfate hemihydrate gypsum. The "dispersed consistency", also known in the art as "consistency" or "water demand", is an important property of the plaster/ Plasters of lower consistency have lower water demand. The normal consistency of stucco (gypsum plaster) is a term of art and is determinable according to ASTM Procedure C472, or substantial equivalents. It is defined as the amount of water in grams per 100 grams of stucco (plaster). The term "dispersed consistency" may be defined as the water volume required to give a standard viscosity or flow when a standard amount by weight of stucco (plaster) is dispersed by mechanical mixing.

Joint Compound Mixtures

As disclosed above, the present invention relates to a setting type joint compound comprising a blend of a joint compound mixture and an activator mixture. The resulting joint compounds have high solids and are sprayable without sagging on walls or prolonged drying times. High solids means 55-88 wt. %, preferably 66-78 wt. %, more preferably 69-78 wt. %, most preferably 72-78 wt. %.

The joint compound mixture is a mixture of the joint compound ingredients and joint compound mixture water. Table 1 provides examples of a dry powder of joint compound mixture ingredients of the present invention. Any preferred range in Table 1 can be substituted for any broad range. Before use to make the joint compound mixture, the joint compound mixture water can be added to the dry powder (also known as dry components or joint compound components other than water) at a weight ratio of the joint compound ingredients to the joint compound mixture water in a range of 9:1-3:2, preferably about 5:1-3:2, more preferably about 3:1-3:2, and most preferably about 3:1. In the present disclosure a dry basis is a water free basis. In contrast, a wet basis is a water inclusive basis.

TABLE 1

Setting-type (ST) joint compound mixture ingredient formulations

| Joint Compound Mixture Ingredients | Useable range | Preferred range | Most preferred range | Specific example |
|---|---|---|---|---|
| Calcium Sulfate Hemihydrate in alpha form with blocky cubic crystal micro-structure (wt. % on dry basis) | 20 to 99 | 50 to 99 | 75-99 | 75-99 |
| Thickening Agent (wt. % on dry basis) | 0-4 | 0.05-2 | 0.1-1 | 0.1-1 |
| Retarder (wt. % on a dry basis) | 0-2 | 0-1 | 0-0.05 | 0-0.5 |
| Chelating agent (wt. % on dry basis) | 0.05-5 | 0.05-2 | 0.25-2 | 0.25-2 |
| Preservative (wt. % on dry basis) | 0-2 | 0-1 | 0.05-0.3 | 0.05-0.3 |
| Optional second chelating agent (wt. % on dry basis) | 0-5 | 0.05-2 | 0.05-1 | 0.05-1 |

TABLE 1-continued

Setting-type (ST) joint compound mixture ingredient formulations

| Joint Compound Mixture Ingredients | Useable range | Preferred range | Most preferred range | Specific example |
|---|---|---|---|---|
| Optional filler (wt. % on dry basis) | 0-80 | 0-50 | 0-25 | 0-25 |
| Optional binder (wt. % on dry basis) | 0-5 | 0-5 | 0-5 | 0-5 |
| Joint Compound Mixture Ingredients:Joint Compound Mixture Water (weight ratio) | 9:1-3:2 | 5:1-3:2 | 3:1-3:2 | 3:1 |

The activator mixture of the present invention is a mixture of the activator mixture ingredients and activator mixture water. Table 2 provides examples of a dry powder of the activator mixture ingredients. Any preferred range in Table 2 can be substituted for any broad range. Before use, to make the activator mixture the activator mixture water can be added to the activator mixture dry powder (also known as dry components or activator mixture components other than water) at a weight ratio of the activator mixture ingredients to the activator mixture water in a range of a range of 9:1-3:2, preferably about 5:1-3:2, more preferably about 3:1-3:2, and most preferably about 2:1.

TABLE 2

Activator mixture formulations (wt. % on dry basis)

| Activator Mixture Ingredients | Useable range | Preferred range | Most Preferred Range | Specific example |
|---|---|---|---|---|
| Dolomitic Calcium Carbonate (wt. % on a dry basis) | 0-95 | 25-95 | 50-95 | 50-95 |
| Thickening Agents (wt. % on a dry basis) | 0-4 | 0.05-2 | 0.1-1 | 0.1-1 |
| Set accelerator (for example) Zinc Sulfate Monohydrate (wt. % on a dry basis) | 5-99 | 5-75 | 5-50 | 5-50 |
| Preservative (w. % on a dry basis) | 0-2 | 0-1 | 0.05-0.3 | 0.05-0.3 |
| Activator mixture Ingredients:Activator mixture Water (weight ratio) | 9:1-3:2 | 5:1-3:2 | 3:1-3:2 | 2:1 |

Typically, a ready-mixed setting-type joint compound mixture formulation comprises or consists essentially of the components in Table 1. Alternatively, the ready-mixed setting-type joint compound mixture formulation can consist of the components in Table 1.

Typically, an activator mixture comprises or consists essentially of the components in Table 2. Alternatively, the activator mixture can consist of the components in Table 2.

Calcium Sulfate Hemihydrate

Setting-type joint compounds include calcium sulfate hemihydrate. There are two principal forms used, the alpha and beta crystalline forms. In general, the alpha form is the more expensive of the two and produces a stronger product. The beta form is adequate for many uses and, being less expensive, is more commonly used. For joint compounds of the invention, the alpha type of the hemihydrate is used in a blocky cubic crystal microstructure. 20 wt. % or less, more preferably 10 wt. % or less of the calcium sulfate hemihydrate may be alpha type in rod-like crystal microstructure and/or beta type in the present invention.

Figure 1:
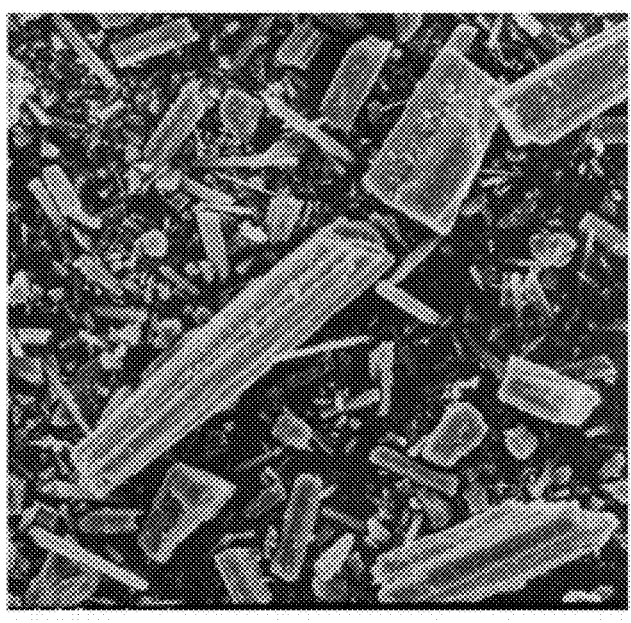
FIG. 1 shows calcium sulfate hemihydrate in an alpha morphological form having rod-like crystal microstructure.
Figure 2:
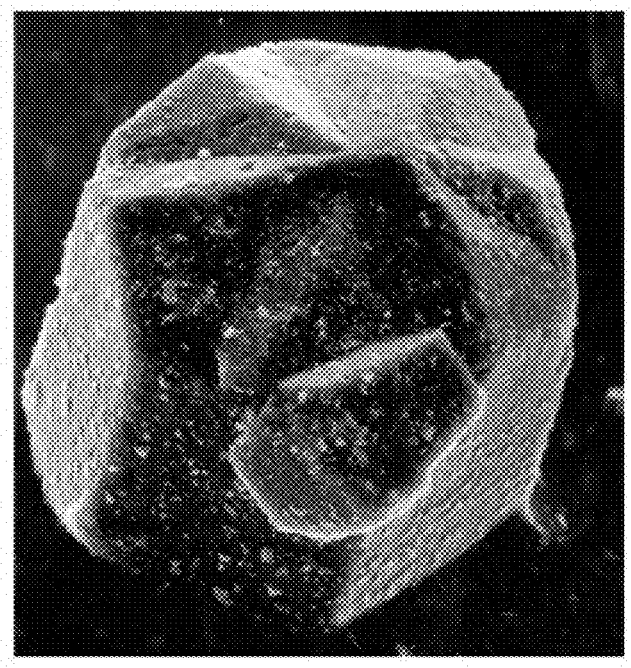
FIG. 2 shows calcium sulfate hemihydrate in an alpha morphological form having blocky cubic crystal microstructure.

The calcium sulfate hemihydrate preferred in the invention is in an alpha morphological form having blocky cubic (as opposed to rod-like) crystal microstructure typically made by autoclaving a gypsum slurry, for example made according to U.S. Pat. No. 7,588,634 herein incorporated by reference, (a typical example of which is HYDROCAL C-Base by US Gypsum Company) with an average particle size of about 15 to about 20 microns, typically about 17 microns. The majority of the calcium sulfate hemihydrate employed in the invention will be in the alpha morphological form having blocky cubic (as opposed to rod-like) crystal microstructure. Cubic crystal microstructure is formed by autoclaving gypsum slurry and typically has a length which is about 1 to 2 times the width. Rod-like crystal microstructure is formed by autoclaving gypsum rocks. FIG. 1 shows an alpha form with rod-like crystal microstructure, formed by autoclaving gypsum rock. FIG. 2 shows an alpha form with blocky cubic crystal microstructure, formed by autoclaving a gypsum slurry.

The calcium sulfate hemihydrate used in the invention is in a gypsum cement which has a normal consistency of 30-39, preferably 31-36 lbs. water/100 lbs. gypsum cement (wherein the gypsum cement is at least 90 wt. % calcium sulfate hemihydrate, more preferably at least 95 wt. %, more preferably 95 wt. %), Vicat set target of 15-30 minutes (hand mix), 3500 psi (compressive strength one hour after set), 7000 psi (compressive strength dry), 116 lbs/cu. Ft. wet density, 105 lbs./cu. ft. dry density, 0.350% maximum expansion and 0.350% final expansion. For example, a suitable gypsum cement is HYDROCAL C-Base brand calcium sulfate hemihydrate available from United States Gypsum Company. U.S. Pat. No. 7,588,634 discloses a method for making USG HYDROCAL C-Base brand calcium sulfate hemihydrate available from United States Gypsum Company.

Typically plaster or Plaster of Paris used as a source of calcium sulfate hemihydrate in the invention is at least 80, at least 90, or at least 95 wt. % calcium sulfate hemihydrate.

For setting-type joint compound mixtures, the calcium sulfate hemihydrate can be included at about 20 wt. % to about 99 wt. % on a dry basis of the joint compound, preferably about 50 wt. % to about 99 wt. % on a dry basis, more preferably about 75 wt. % to about 99 wt. % on a dry basis.

Inert Fillers

Examples of inert fillers for joint compound mixtures of the invention include, but are not limited to, calcium carbonate (or limestone), dolomitic calcium carbonate, calcium sulfate dihydrate, talc, glass micro bubbles, mica, perlite, pyrophyllite, silica, calcium sulfate anhydrite, diatomaceous earth, clay (e.g., attapulgite, sepiolite and kaolin), resin microspheres, and mixtures thereof. In one embodiment, the inert filler comprises calcium carbonate at about 25 to 95 wt. % of the activator mixture ingredients.

Perlite or expanded perlite is a lightweight filler that may be used where the joint compound is preferably lightweight. Use of expanded perlite in a lightweight joint compound is taught in U.S. Pat. No. 4,454,267, which is herein incorporated by reference. Expanded perlite is a very lightweight material that contains many cracks and fissures. It can be treated according to the teachings of U.S. Pat. No. 4,525, 388, which is hereby incorporated by reference, so that the material does not increase in weight due to water absorbed by capillary action. The treated, expanded perlite, when used, is preferably present in concentrations of at least 5 wt. % on a dry basis of the joint compound mixture.

Any joint compound mixture of the present invention optionally includes resin microspheres as a filler to be used in place of or in addition to expanded perlite in lightweight formulations. Preferred shell resins suitable for use in the present invention are homopolymers, copolymers, or blends of homopolymers and/or copolymers formed one or more of acrylonitrile ("ACN"), vinylidene chloride ("VDC"), or methyl methacrylate ("MMA") monomers. Particularly preferred resins are polyacrylonitrile ("PACN"), polyvinylidene chloride ("PVDC"), copolymers formed from ACN and VDC, and copolymers found from ACN, VDC, and MMA. The microspheres demonstrate high resiliency to compression without collapse (non-friable) and are able to withstand the exerted shear stress (shear-stability) of a typical joint treatment manufacturing process and subsequent customer preparation.

Binders

Any binder that is suitable for use in a joint compound is appropriate for use in the present invention. The binder can enhance the adhesion of the joint compound to its substrate, typically drywall. Preferred binders are soft and pliable rather than being extremely hard. Hard binders are likely to create more fine dust particles compared to pliable polymers.

Examples of binders include, but are not limited to, polyvinyl acetate, polyvinyl alcohol, ethylene vinyl acetate co-polymer, vinyl chlorides, vinyl acrylic co-polymer, styrene acrylics, styrene butadiene, polyacrylamide, polyvinyl acrylic, latex emulsions, natural and synthetic starch, casein, and mixtures thereof.

For example, latex emulsion binders are often used in joint compounds (drying-type and/or setting-type) and may be included in joint compound mixtures of the invention. Examples include polyvinyl acetate and ethylene vinyl acetate emulsions. The amount used may range from about 1.5 wt. % to about 7 wt. % on a dry basis of the joint compound mixture, preferably about 2 wt. % to about 5.5 wt. % on a dry basis.

The weight ratio of total fillers to total binders is preferably in the range of from about 15:1 to about 5:1.

Thickening Agents

Thickening agents are added to the joint compound mixture of the present invention. After water is added to the composition, the thickener becomes hydrated and swells, thereby thickening the joint compound.

Thickeners are useful, for example, in helping to create the body and flow properties commonly associated with joint compounds, including preventing sag on the wall and in-can settling. Preferably, the thickener is selected so that it substantially hydrates during the mixing process after water is added to the composition, with little or no hydration of the thickener occurring after mixing is completed, to prevent formation of lumps in the joint compound.

Examples of thickening agents include, but are not limited to, ethylhydroxy ethylcellulose, hydroxypropyl methylcellulose, methylhydroxypropyl cellulose, hydroxyethyl cellulose, cellulose-based gums (e.g., xanthan gum, gum Arabic, alginate, pectin, and guar gums), acrylic thickeners (such as alkali soluble emulsion "ASE", hydrophobically modified alkali soluble emulsion "HASE"), clay thickeners (such as attapulgite clay, bentonite) and mixtures thereof.

For sprayable ready-mixed setting-type joint compounds, thickening agents, when included, can be at 0 wt. % to about 4 wt. % on a dry basis of the joint compound mixture, preferably about 0.05 wt. % to about 2 wt. % on a dry basis, and most preferably about 0.1 wt. % to about 1 wt. % on a dry basis.

For activator mixtures, thickening agents, when included, can be at 0 wt. % to about 4 wt. % on a dry basis of the activator mixture, preferably about 0.05 wt. % to about 2 wt. % on a dry basis, and most preferably about 0.1 wt. % to about 1 wt. % on a dry basis.

Retarders

Retarders may be included in the joint compounds. Retarders (or set inhibitors or set preventer) slow the setting and/or drying of the joint compounds to provide ample time to properly apply the joint compound.

Examples of retarders include, but are not limited to, polymer compositions including acrylic acid and acrylamide monomer units (e.g., a copolymer (or a mixture of copolymers) of acrylic acid and acrylamide or a blend of a homopolymer of acrylic acid and a homopolymer of acrylamide), as described in U.S. Pat. No. 5,779,786, incorporated herein by reference.

Additional examples of non-calcium bearing phosphate retarders include, but are not limited to, zinc hexametaphosphate, potassium tripolyphosphate, tetra sodium pyrophosphate, sodium tripolyphosphate, monoammonium phosphate, and monobasic potassium phosphate, as described in U.S. Pat. No. 5,746,822, incorporated herein by reference.

Examples of retarders include, but are not limited to, polymer compositions including polyacrylic acid and/or a salt of polyacrylic acid, as described in U.S. Pat. No. 6,805,741, incorporated herein by reference.

For sprayable ready-mixed setting-type joint compounds, retarders can be included at about 0 wt. % to about 2 wt. % on a dry basis of the joint compound mixture, preferably about 0 wt. % to about 1 wt. % on a dry basis, more preferably about 0 wt. % to about 0.5 wt. % on a dry basis.

Set Accelerators

Set accelerators are included in the activator mixture.

Set accelerators (or set initiators or activators) accelerate and/or initiate setting and/or drying of the joint compounds.

Examples of set initiators include, but are not limited to, metallic salts that provide acidic cations, such as zinc sulfate, aluminum sulfate, potassium sulfate, calcium sulfate, ferric sulfate, ferric chloride, and mixtures thereof, as described in U.S. Pat. No. 5,779,786, incorporated herein by reference, preferably aluminum sulfate and/or zinc sulfate, most preferably zinc sulfate or zinc sulfate monohydrate. Another example of set initiators include, but are not limited to, zinc sulfate optionally in combination with iron oxide (e.g., in a weight ratio of 19:1).

Set accelerators are included in the activator mixture about 5 wt. % to about 99 wt. % on a dry basis of the activator mixture, preferably about 5 wt. % to about 75 wt. % on a dry basis, more preferably about 5 wt. % to about 50 wt. % on a dry basis.

Other Additives

Other additives optionally included in joint compounds include, but are not limited to, preservatives, fungicides, bactericides, defoaming agents, dedusting agents, glycols, humectants, waxes, rosins, shellacs, pitches, fatty acids, tall oils, polyethylene glycols, methoxy polyethylene glycols, polyethylene oxides, methoxy polyethylene oxides, petroleum oil, petroleum residues, paraffins, cellulosic fibers, celluloses, mineral wool, perlites, hydraulic cements, starches, total gypsum (calcium sulfate dihydrate), calcium sulfate anhydrite, surfactants, anionic surfactants, cationic surfactants, zwitterionic surfactants, nonionic surfactants, galactomannan, polygalactomannan, hydrophobically modified galactomannan, hydrophobically modified polygalactomannan, and mixtures thereof. These other additives may be present or absent from the joint compound, the joint compound mixture or the activator mixture. Other additives may comprise 0-10% of the joint compound, joint compound mixture and/or the activator mixture. For setting-type joint compounds, when included, other additives (in total) can be included at about 0.01 wt. % to about 10 wt. % on a dry basis of the joint compound mixture, preferably about 0.01 wt. % to about 5 wt. % on a dry basis, and most preferably about 0.1 wt. % to about 1.0 wt. % on a dry basis.

Defoamers reduce or hinder the formation of air bubbles, which may form especially when mixing. Examples of defoamers include, but are not limited to, hydrocarbon-based, silicon-based defoamer, and mixtures thereof.

Dedusting agents reduce dust formed when between coats of joint compound, and before the wall is decorated, the joint compound is sanded to even the surface.

A glycol can be used in a joint compound to provide functional properties to the joint compound such as wet edge, open time, controlling drying time, and freeze/thaw stability. Examples of glycols include, but are not limited to, diethyl glycol, ethylene glycol, propylene glycol, and mixtures thereof. When included, the amount of glycol used in a joint compound of the invention is preferably in a range of about 0.1 wt. % to about 1 wt. % on a dry basis of the joint compound mixture.

Systems

The invention also provides a two-part system for making the joint compound comprising a joint compound mixture and an activator mixture, said joint compound mixture being mixable with the activator mixture;

(A) wherein the joint compound mixture comprises (a) joint compound mixture ingredients comprising in weight percent on a dry basis:

about 20 to about 99 wt. % calcium sulfate hemihydrate in an alpha morphological form having blocky cubic crystal microstructure with a D50 average particle size of about 15 to 50 microns, for example 15 to 20 microns or 20 to 50 microns, about 0-4 wt. % thickening agent, about 0-2 wt. % set retarder, about 0.05-5 wt. % chelating agent, wherein the chelating agent is selected from tetra sodium pyrophosphate or tetra potassium pyrophosphate, about 0-2 wt. % preservative, optionally about 0-5 wt. % second chelating agent, optionally about 0-80 wt. % a filler, and optionally about 0-5 wt. % binder, and (b) joint compound mixture water, wherein weight ratio of the joint compound mixture ingredients to the joint compound mixture water is within a range of 9:1 to 3:2, and (B) an activator mixture, wherein the activator mixture comprises:

(a) activator mixture ingredients comprising in weight percent on a dry basis:

inert filler at about 0-95 wt. % of the activator mixture ingredients, set accelerator at about 5-99 wt. % of the activator mixture ingredients, thickening agent at about 0-4 wt. % of the activator mixture ingredients, preservative at about 0-2 wt. % of the activator mixture ingredients, and (b) activator mixture water, wherein weight ratio of the activator mixture ingredients to the activator mixture water is within a range of 9:1 to 1:1, wherein a weight ratio of joint compound mixture:activator mixture is 1:1 to 100:1, preferably 1:1 to 10:1, wherein the activator mixture viscosity is the same as the joint compound mixture viscosity plus or minus 50%, preferably plus or minus 20%, most preferably plus or minus 10%, wherein the joint compound mixture viscosity is between 2,500-28,000 cps, wherein the activator mixture viscosity is between 2,500-28,000 cps, wherein the joint compound viscosity is between 2,500-28,000 cps, and wherein the joint compound has about 55 to about 88 wt. % solids, wherein the joint compound mixture has about 55 to about 88 wt. % solids, preferably about 72 to about 78 wt. % solids, wherein the activator mixture has about 55 to about 88 wt. % solids.

One embodiment of the system has a joint compound mixture with a viscosity of about 4,000-5,600 cps and an activator mixture with a viscosity of about 4,000-5,600 cps.

One embodiment of the system has a joint compound which consists essentially of the joint compound mixture and the activator mixture.

One embodiment of the system has a joint compound mixture which consists essentially of the joint compound mixture ingredients and joint compound mixture water.

One embodiment of the system with an activator mixture which consists essentially of the activator mixture ingredients and activator mixture water.

The joint compound of the system may comprise a custom colorant.

The joint compound mixture of the system may comprise a custom colorant, wherein the colorant is a different color from the color of the activator mixture.

The activator mixture of the system may comprise a colorant, wherein the colorant is a different color from the color of the joint compound mixture.

The system mixes and applies the joint compound by spraying the joint compound with a spray gun for example.

Figure 3:
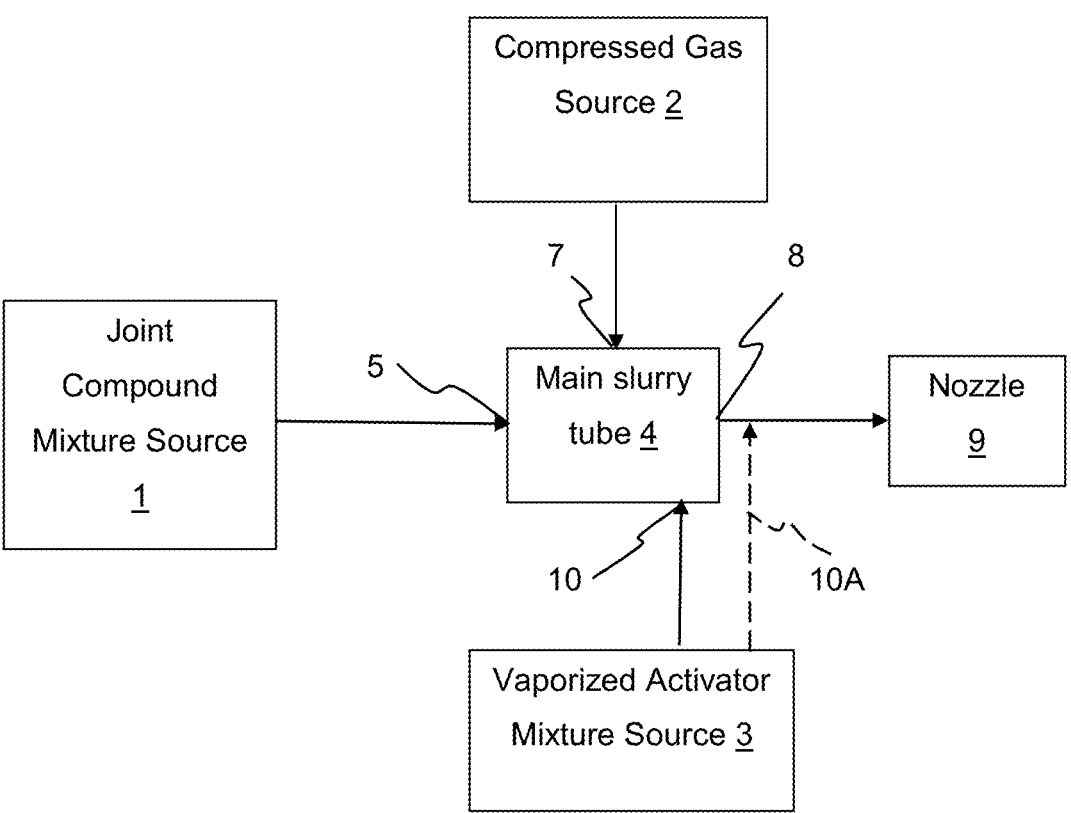
FIG. 3 shows a system for mixing and spraying joint compound.

FIG. 3 shows a system for mixing and spraying joint compound. The system, shown in FIG. 3, has two parts, the first part is a joint compound mixture, from joint compound mixture source, which is in a semi-liquid form and the second part is an activator mixture in a liquid form that is to be vaporized. The spray gun has a main slurry tube with an inlet and an outlet. Adjacent to the main slurry tube outlet is a nozzle. The joint compound mixture is introduced from the joint compound mixture source (1) at the inlet (5) into the main slurry tube (4) in the spray gun. Downstream of the inlet (5), compressed gas (preferably compressed air) is injected from a compressed gas source (2) at an air supply inlet (7) into the main slurry tube (4) to form a compressed gas and joint compound mixture. A vaporized activator mixture source (3) provides vaporized activator mixture as a combination of the liquid activator mixture and compressed gas (preferably compressed air). Downstream of the air supply inlet (7) and preferably adjacent to the main slurry tube outlet (8) and a nozzle (9), the activator mixture in vaporized form from vaporized activator mixture source (3) is introduced at the activator mixture inlet (10) into the compressed gas and joint compound mixture. This mixes the joint compound mixture and activator mixture. Alternatively an airless machine may be used, such as a Graco MARK 5, where the fluids are pressurized and therefore no compressed gas is used, therefore compressed gas source (2) is absent. The activator mixture may or may not enter the main slurry tube. Thus, the mixture containing the compressed gas and joint compound mixture that discharges from main spray tube outlet (8), may discharge including the activator mixture. In the alternative, the mixture containing the compressed gas and joint compound mixture that discharges from main spray tube outlet (8), may discharge without the activator mixture and then the activator mixture (alternative vaporized activator mixture stream 10A) is added prior to discharge from the nozzle (9). Preferably the activator mixture does not enter the main slurry tube (4) so that clogging of the main slurry tube is prevented. The joint compound including the blend of the joint compound mixture and activator mixture is then sprayed from the nozzle (9) of the spray gun.

Figure 4:
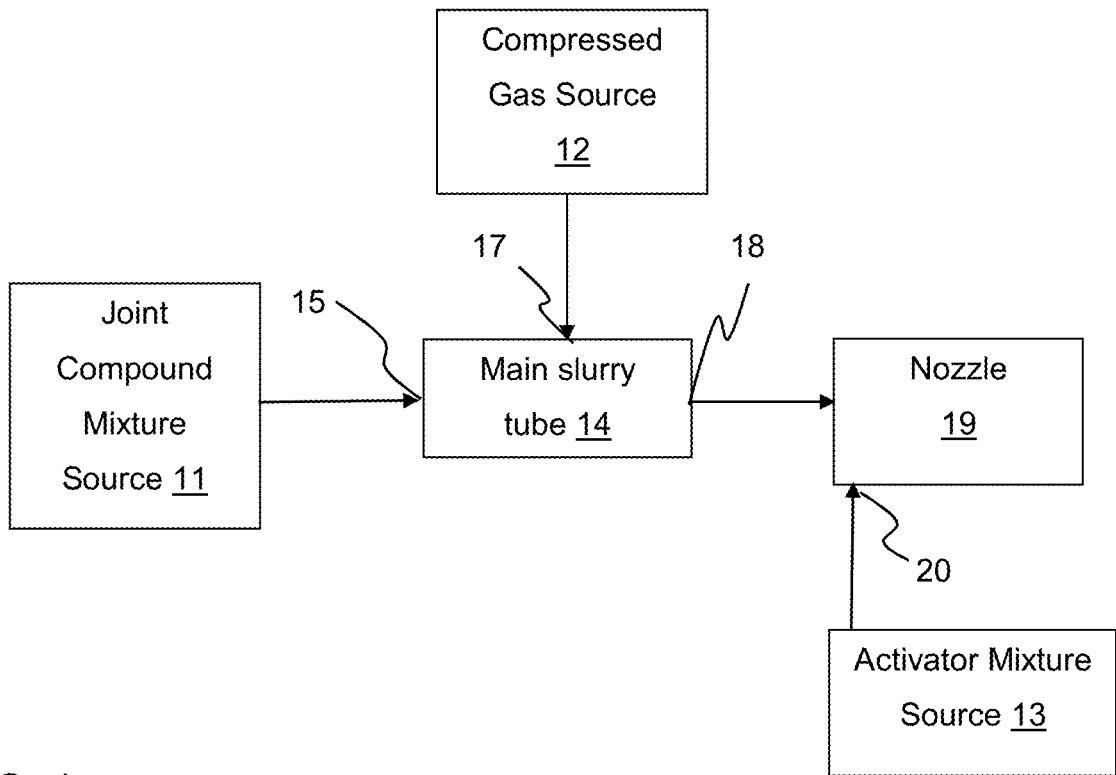
FIG. 4 shows a system for mixing and spraying joint compound.

FIG. 4 shows another version of a system for mixing and spraying joint compound. In FIG. 4, the system has two parts, the first part is a joint compound mixture which is in a semi-liquid form and the second part is an activator mixture in a semi-liquid form. The spray gun has a main slurry tube (14) with an inlet (15) and an outlet (18). Adjacent to the outlet (18) is a nozzle (19). The joint compound mixture is introduced from a joint compound mixture source (11) into the main slurry tube (14) in the spray gun at the main slurry tube inlet (15). Downstream of the inlet (15), compressed gas (preferably compressed air) is injected from a compressed gas source (12) at the gas (air) supply inlet (17) into the main slurry tube (14) to form a compressed gas (air) and joint compound mixture in the main slurry tube (14) which discharges through the outlet 18 and proceeds to the nozzle 19. The activator mixture from activator mixture source (13) may be introduced to the compressed air and joint compound mixture at the nozzle (19) using an injection device (20) as shown in FIG. 4 to mix the joint compound mixture and activator mixture. The resulting joint compound is then sprayed from the nozzle (19) of the spray gun.

Figure 9:
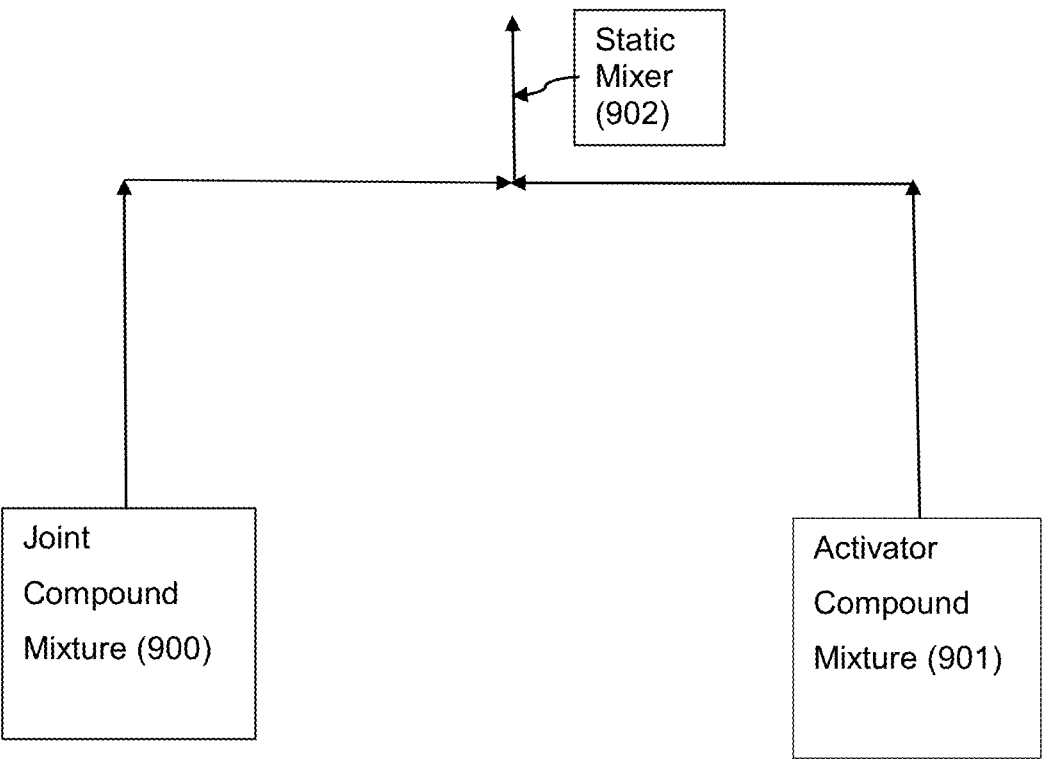
FIG. 9 shows a manifold system used for mixing the joint compound mixture and the activator mixture.

FIG. 9 shows another version of a system for mixing and spraying joint compound. The joint compound mixture (900) is pumped and the activator mixture (901) is pumped, to the entrance to the static mixture (902). The joint compound (after being mixed in the static mixture) exits the static mixture.

Pumps, for example spray guns, may be used to disperse the joint compound. Pumps currently available on the market are often 1:1 ratios for a 2-part system. In the prior art, the 1:1 ratio would reduce the consistency of the product so much it would not be able to hold up on the wall. However, the present invention may be pumped at any ratio 1:1 to 100:1 (Joint compound mixture:activator mixture) without affecting the viscosity of the product. An example of a spray gun that may be employed is the Graco SPACKMAX.

Figure 5:
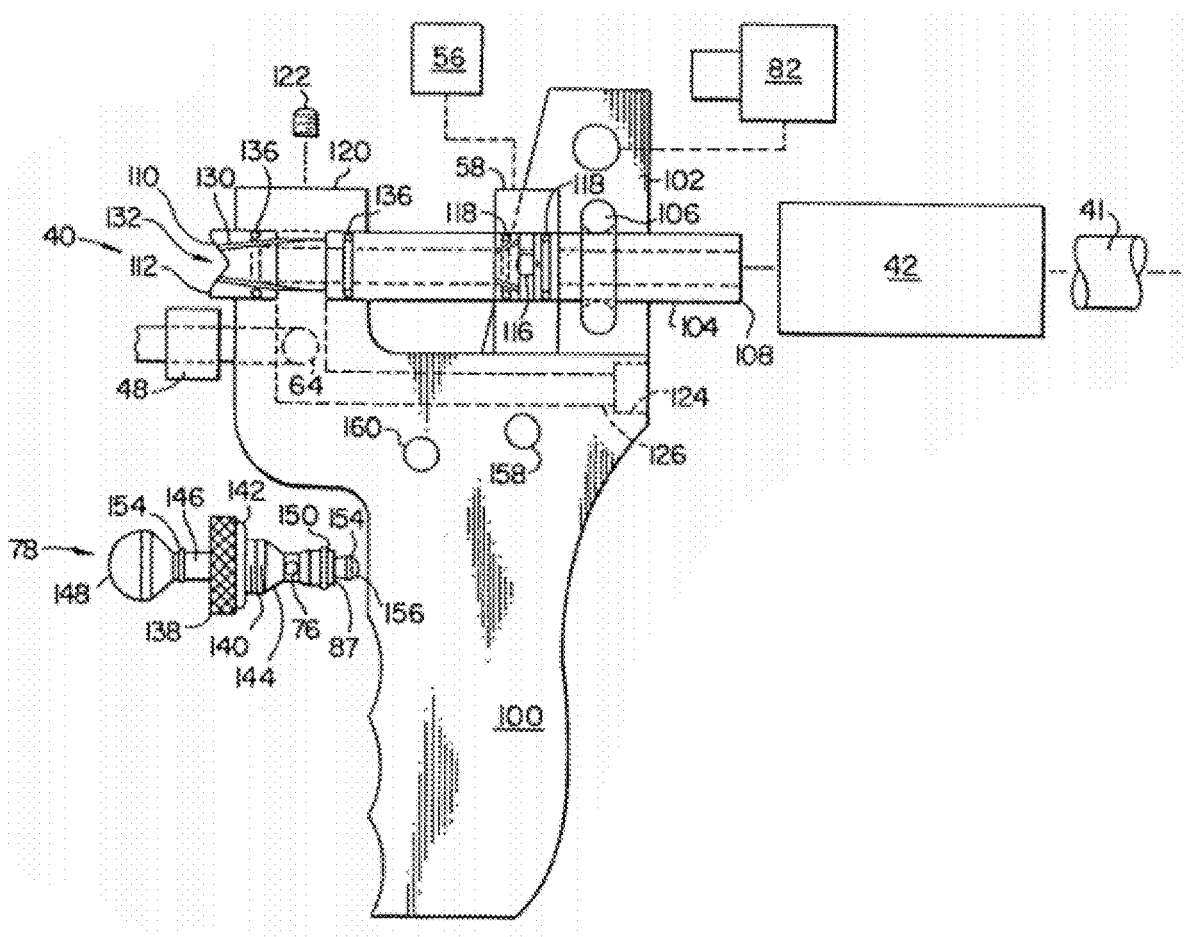
FIG. 5 is a diagrammatic side elevational view of the applicator or spray gun used in the system of FIGS. 3 and 4.

Referring now to FIG. 5, the spray gun 40 is depicted, and in the preferred embodiment, is based on a prior design produced by E.S. Manufacturing, Inc. of St. Petersburg, Fla., in which the plaster slurry was merely externally atomized by compressed air. The present spray gun 40 is designed to be used with all slurry viscosities, but most particularly, with very low viscosities, and at high volume outputs, especially when the slurry is cohesive (sticky). Included on the spray gun 40 is a handle 100 having a vertically extending chopper bracket 102 onto which is clamped a main slurry passageway or tube 104 by at least one U-clamp 106. In the preferred embodiment, the U-clamp 106 is fastened to the bracket 102 by threaded fasteners such as hex nuts (not shown), however other types of conventional fastening technologies are contemplated.

The main slurry tube 104 has an inlet or supply end 108 to which is connected, and in fluid communication with, the main slurry pinch valve 42. Opposite the supply end 108 is an outlet end 110, to which is secured a nozzle 112. It is contemplated that the outlet end 110 may have many configurations, including straight and in line with the passageway 104, in the preferred embodiment, the outlet end 110 gradually and slightly narrows toward the nozzle 112 to facilitate the creation of a uniform spray pattern.

Downstream of the main pinch valve 42 is the air supply inlet 58 which is configured as a halo fitting configured for circumscribing the main passageway 104. In addition, the inlet 58 and is in fluid communication with the main passageway 104 via a ring of arcuately spaced, forwardly angled (toward the outlet end 110), first compressed gas inlet openings 116 for introducing a flow of compressed gas (preferably air from the compressor 38) into the main passageway. This fitting 58 is also known as the preatomizing point, because the compressed air that is introduced here is forced into the main slurry flow to atomize it and make it easier to spray. To seal the air flow into the passageway 104, a pair of O-rings 118 are disposed on either side of the ring of openings 116. As will be seen from FIG. 5, the halo fitting 58 is disposed generally intermediate the supply end 108 and the outlet end 110. The compressed air that is introduced into the halo fitting 58 is controlled by the pneumatic pilot pinch valve 56.

Another feature of the present spray gun 40 is that it introduces two sources of compressed gas (air) into the slurry to properly atomize the slurry for improved spray performance. As described above, the first introduction of compressed gas occurs at the halo fitting 58. A second pressurized gas inlet 120 is disposed closer to the outlet end 110 than is the halo fitting 58 and is placed in relation to the passageway 104 for introducing a second supply of pressurized gas into the slurry. In the preferred embodiment, the second gas inlet 120 is linearly displaced from the halo fitting 58 however other dispositions are contemplated.

Yet another feature of the present system 10 is that the second inlet 120 is also the point at which the activator mixture from the activator mixture source 44 is introduced in vaporized form, into the slurry. By introducing the activator mixture adjacent the nozzle 112, the activator mixture does not actually enter the passageway 104, and thus the clogging problem of prior art spray applicators is solved. While the preferred position of the second inlet 120 is adjacent the outlet end 110 and the nozzle 112, it is contemplated that, if the problem of premature slurry setting can be addressed, the second inlet may be positioned along the passageway 104 and closer to the halo fitting 58 so that the blended gas (activator mixture and compressed air) is mixed with the combination of the slurry and the pressurized gas between the first inlet and the outlet end.

In shape, the second inlet 120 is preferably integrally cast, molded or formed with the handle 100, and is configured to circumscribe the passageway 104, and provides a second attachment point of the passageway 104 to the spray gun 40. In the preferred embodiment, a threaded fastener 122 is provided for anchoring the outlet end 110 of the passageway 104 to the spray gun 40.

The second pressurized air inlet 120 is placed in fluid communication with a supply of pressurized, so-called external pre-atomization air from the compressor 38. An inlet 124 in the spray gun 40 is in fluid communication with the air supply from the compressor 38. An air passageway 126 in the handle 100 provides a fluid conduit between the inlet 124 and the second inlet 120.

Intermediate the inlet 124 and the second inlet 120 is the activator mixture inlet 64 which receives pressurized activator mixture from the holding tank 44 and is controlled by the pneumatic pinch valve 48. Thus, prior to reaching the second inlet 120, the compressed air and activator mixture from the holding tank 44 is mixed or blended with additional external atomization air from the compressor 38. In this manner, the activator mixture is vaporized so that it is more uniformly dispersible in the slurry.

Alternatively, it is also contemplated that the activator mixture fluid may be introduced to the slurry spray at the nozzle 112 using a device known in the industry as a "catalyst injection device", a suitable example of which is manufactured by ITW-Binks Manufacturing Co. of Franklin Park, Ill. Such a device includes an activator mixture tank holding activator mixture fluid, which may be pressurized, like the holding tank 44. Compressed air, which will be used as the external air of atomization to be fed to the halo fitting 58, passes over a venturi, creating a vacuum which draws activator mixture fluid from the tank. Flow from the venturi is monitored by a metering device as is known in the art.

The activator mixture is vaporized into the stream of compressed air, after which it is carried through a reinforced hose to the spray gun 40 entering at point 124 (FIG. 5). This alternative construction is considered substantially equivalent to the preferred system described above, and is preferred when using a viscous activator. Yet another alternative is to introduce a relatively viscous activator, such as described in U.S. patent application Ser. No. 09/502,609 and incorporated by reference, through a mechanical pump, such as a piston, diaphragm or other type of metering pump directly to the spray gun 40 at point 64. It is also contemplated that, when slurries of other constituents, such as Portland cement or magnesium phosphate products are used, it could be introduced at the first air supply inlet 58.

Referring now to FIGS. 5 and 6, the second inlet 120 is provided with a plurality of diametrically spaced, inclined air jets 130 which receive the vaporized activator mixture and dispense it from the nozzle 112 adjacent a main slurry outlet 132. In the preferred embodiment, the main slurry outlet 132 is located at the outlet end 110 of the passageway 104. The air jets 130 are preferably disposed in spaced, surrounding relationship to the main slurry outlet 132, which is of a relatively larger diameter than the jets 130. In this manner, the vaporized activator mixture can be more evenly distributed in the slurry. In the preferred embodiment, the nozzle 112 is configured with a pair of inclined walls 134 so that the air jets 130 impact the slurry flow on an angle. As is the case with the inlet 58 the inlet 120 is provided on either side with an O-ring 136.

The trigger valve 78 is provided on the handle 100 of the spray gun 40 and is placed in fluid communication with the pneumatic control manifold 50. In the preferred embodiment, the trigger valve 78 is a plunger or piston type known in the art, and a suitable model is No. G300-001 produced by E.S. Manufacturing of St. Petersburg, Fla. The trigger valve 78 has a knurled outer boss 138 integrally affixed to a threaded nipple portion 140 which threadably engages a threaded bore (not shown) in the handle 100. An O-ring 142 maintains an air seal at that connection. A main body 144 of the valve 138 defines an axial chamber (not shown) in which reciprocates a poppet 146. An outer end 148 of the poppet 146 serves as the trigger which is actuated by the operator. In combination with the O-ring 142, a relatively smaller O-ring 150 on the main body 144 isolates the outlet 76. Two additional O-rings 154 on the poppet 146 pneumatically isolate the poppet. In a normally closed position, air pressure from the compressor 38 forces a small end 156 of the poppet against the valve body 144 where it is pneumatically sealed by the adjacent small O-ring 154.

To emit slurry, the incoming air 87 from the pressure regulator 86 and the air exiting from the regulator 86 provides the pneumatic pressure to operate the pilot valve 68. Upon depression of the trigger 148, the regulator 86 is placed in fluid communication with the pilot valve 68. Air is fed to the trigger valve 78 through an air inlet 158 located on the handle 100 of the spray gun 40, and is emitted from the outlet port 76 to a gun outlet 160 and into the manifold 50 to initiate flow of slurry.

Referring to FIG. 5, if desired, the system 10 may be equipped with the chopper attachment or chopper gun 82 for introducing chopped fiberglass roving fibers into the slurry stream. The incorporation of such fibers is intended to increase the strength of the set plaster. Such attachments are known in the art, and are pneumatically operated. In the system 10, the chopper attachment 82 is preferably mounted to the chopper bracket 102, and is connected to the pneumatic control box 48 so that it is operated by the pilot valve 80. Once mounted, the chopped fiberglass fibers are combined with the slurry externally of the passageway 104 as is known in the art.

Methods of Use

The invention also provides a method of dispersing joint compound comprising mixing a joint compound mixture and an activator mixture and spraying the joint compound through a nozzle on a spray gun, (A) wherein the joint compound mixture comprises (a) joint compound mixture ingredients comprising in weight percent on a dry basis:

about 20 to about 99 wt. % calcium sulfate hemihydrate in an alpha morphological form having blocky cubic crystal microstructure with a D50 average particle size of about 15 to 50 microns, for example 15 to 20 microns or 20 to 50 microns, about 0-4 wt. % thickening agent, for example attapulgite clay, about 0-2 wt. % set retarder, about 0.05-5 wt. % chelating agent, wherein the chelating agent is selected from tetra sodium pyrophosphate or tetra potassium pyrophosphate, about 0-2 wt. % preservative, optionally about 0-5 wt. % second chelating agent, optionally about 0-80 wt. % filler, and optionally about 0-5 wt. % binder, and (b) joint compound mixture water, wherein weight ratio of the joint compound mixture ingredients to the joint compound mixture water is within a range of 9:1 to 3:2, and (B) wherein the activator mixture comprises:

(a) activator mixture ingredients comprising in weight percent on a dry basis:

inert filler, for example dolomitic calcium carbonate, at about 0-95 wt. % of the activator mixture ingredients, preferably about 25 to 95 wt. % of the activator mixture ingredients, more preferably about 50 to 95 wt. % of the activator mixture ingredients set accelerator, for example zinc sulfate monohydrate, at about 5-99 wt. % of the activator mixture ingredients, thickening agent at about 0-4 wt. % of the activator mixture ingredients, preservative at about 0-2 wt. % of the activator mixture ingredients, and (b) activator mixture water, wherein weight ratio of the activator mixture ingredients to the activator mixture water is within a range of 9:1 to 1:1, wherein a weight ratio of joint compound mixture: activator mixture is 1:1 to 100:1, preferably 1:1 to 10:1, wherein the activator mixture viscosity is the same as the joint compound mixture viscosity plus or minus 50%, preferably plus or minus 20%, most preferably plus or minus 10%, wherein the joint compound mixture viscosity is between 2,500-28,000 cps, wherein the activator mixture viscosity is between 2,500-28,000 cps, wherein the joint compound viscosity is between 2,500-28,000 cps, and wherein the joint compound has about 55 to about 88 wt. % solids, preferably about 72 to 78 wt. % solids, wherein the joint compound mixture has about 55 to about 88 wt. % solids, wherein the activator mixture has about 55 to about 88 wt. % solids.

One embodiment of the method has a joint compound mixture with a viscosity of about 4,000-5,600 cps, a ratio of joint compound mixture:activator mixture of 1:1 to 10:1 and an activator mixture with a viscosity of about 4,000-5,600 cps.

The joint compound of the method may comprise a custom colorant.

The joint compound mixture of the method may comprise a custom colorant, wherein the colorant is a different color from the color of the activator mixture.

The activator mixture of the method may comprise a colorant, wherein the colorant is a different color from the color of the joint compound mixture.

The joint compounds described herein can be applied by spraying onto a surface (e.g., a gypsum board) and allowed to dry and/or set. The dried/set joint compound can then be dry sanded, or wet sanded or sponged. Alternatively, because the joint compounds described herein have improved smoothness when dried/set, the joint compounds can be wet sanded after drying and/or setting.

Dry sanding is generally done by rubbing with dry sandpaper, optionally with a vacuum attachment (e.g., using a drywall vacuum sander). Wet sandpaper is done for example by rubbing with wet sandpaper. Sponging is rubbing the applied joint compound with a sponge wetted with water to be damp. One or more of these can be performed with a vacuum attachment (e.g., using a drywall vacuum sander) to collect any dust formed. Alternatively or additionally, one or more of these methods can be performed in a negative pressure enclosure (e.g., a plastic enclosure with a fan to create negative pressure in the enclosure).

A custom colorant may be added to the joint compound in an embodiment. This provides the benefit of eliminating the need to paint after the joint compound is used.

Examples of colorants or tints include but are not limited to iron, manganese, titanium, zinc, carbon, and other organic pigments (for example alizarin, and indigo).

In an embodiment, a colorant (or tint) may be added to one of the joint compound mixture or the activator mixture or a different colorant (or tint) may be added to each of the joint compound and activator mixture. This provide the benefit of being able to verify that the joint compound and activator mixture are properly mixed by looking at the color after mixing. This ensures visual confirmation of the activation of the joint compound. With one colorant (or tint) added to one of the joint compound mixture or the activator mixture, the distribution of the color throughout the mixture indicates that the joint compound and activator mixture are properly mixed by looking at the color after mixing. If a different colorant (or tint) is added to each of the joint compound and activator mixture, the distribution of the blended resulting single color throughout the mixture indicates that the joint compound and activator mixture are properly mixed by looking at the color after mixing.

Advantageously, the joint compound of the invention preferably has at least a 30%, more preferably 35-45% and furthermore preferably 37% increase in hardness (Shore Hardness Type D) compared to the prior art painted drywall surface This provide a more durable surface that could be sprayed or applied in high traffic or abuse prone areas, such as corners, hallways, and doors.

TABLE A

| Shore Hardness per ASTM D2240 | |
| --- | --- |
| | Shore Hardness Type D* |
| Painted drywall surface | 51 |
| Spray applied compound surface | 70 |

*Shore Harness measured according to ASTM D2240-15(2021), Standard Test Method for Rubber Property-Durometer Hardness, ASTM International, West Conshohocken, PA, 2021.

In the present specification any percentage not specified is weight percent unless apparently otherwise. In the present specification a dry basis is a water free basis and a wet basis is a water inclusive basis.

Example 1

A drying study was performed comparing various ready-mixed setting type joint compounds. Compound A is a 58% solids compound formulated for conventional hand application of drywall joints and utilizes high consistency hemihydrate plaster (HYDROCAL B-Base), Compound B is a 67% solids compound formulated for spray application and utilizes high consistency hemihydrate plaster (HYDROCAL B-Base), Compound C is a 67% solids compound formulated for spray application and utilizes low consistency hemihydrate plaster (HYDROCAL C-Base), Compound D is 75% solids compound formulated for spray application and utilizes low consistency hemihydrate plaster (HYDROCAL C-Base), The drying study showed faster drying with the new high solids trial formulation in combination with HYDROCAL C-Base plaster to achieve even higher solids at a sprayable viscosity. This is shown in FIG. 7.

Example 2

The drying rate of current ready-to-set formulations for spray applications was compared with the invention. Table 3 shows the data from the testing (described below) of the joint compounds resulting from the combination of each of Compounds A, B, C and D (Tables 4-7 respectively) with the activator mixture set forth in Table 8. Compounds A, B and C combined with the activator mixture are comparative examples for the inventive joint compound of Compound D with the activator mixture.

TABLE 3

| Compound | A | B | C | D |
| --- | --- | --- | --- | --- |
| Plaster type | Hand applied High consistency | Spray applied High consistency | Spray applied Low consistency | Spray applied Low consistency |
| Total Water (wt. %) | 42 | 33 | 33 | 25 |
| Viscosity (cps) | 17,729 | 5,527 | 1,815 (too low for use) | 4,005 |
| % Solids | 58 | 67 | 67 | 75 |
| Cure Set Time (min.) | 26 | 39 | 46 | 23 |

Table 4 shows the composition of Compound A.

TABLE 4

| Compound A | |
| --- | --- |
| Ingredient | Percent weight |
| High consistency hemihydrate plaster (HYDROCAL B-base) | 37.18 |
| Dolomitic limestone | 9.60 |
| Perlite | 3.89 |
| Attapulgite clay | 2.83 |
| Thickening agent | 0.28 |
| Dry binder | 0.11 |
| Retarder | 0.05 |
| Liquid binder | 2.98 |
| Chelating agent a | 0.25 |
| Chelating agent b | 0.07 |
| Preservative | 0.27 |
| Water | 42.49 |

Table 5 shows the composition of Compound B.

TABLE 5

| Compound B | |
| --- | --- |
| Ingredient | Percent weight |
| High consistency hemihydrate plaster (HYDROCAL B-base) | 65.41 |
| Attapulgite clay | 0.76 |
| Thickening agent | 0.22 |
| Retarder | 0.10 |
| Chelating agent a | 0.49 |
| Chelating agent b | 0.17 |
| Preservative | 0.15 |
| Water | 32.70 |

Table 6 shows the composition of Compound C.

TABLE 6

| Compound C | |
| --- | --- |
| Ingredient | Percent weight |
| Low consistency hemihydrate plaster (HYDROCAL C-base) | 65.14 |
| Attapulgite clay | 0.76 |
| Thickening agent | 0.22 |

TABLE 6-continued

| Compound C | |
| --- | --- |
| Ingredient | Percent weight |
| Retarder | 0.10 |
| Chelating agent a | 0.49 |
| Chelating agent b | 0.17 |
| Preservative | 0.15 |
| Water | 32.70 |

Table 7 shows the composition of Compound D.

TABLE 7

| Compound D | |
| --- | --- |
| Ingredient | Percent weight |
| Low consistency hemihydrate plaster (HYDROCAL C-base) | 73.95 |
| Attapulgite clay | 0.25 |
| Thickening agent | 0.16 |
| Retarder | 0.11 |
| Chelating agent a | 0.56 |
| Chelating agent b | 0.20 |
| Preservative | 0.12 |
| Water | 24.66 |

TABLE 8

| Activator Mixture Compound | |
| --- | --- |
| Ingredient | Percent weight |
| Dolomitic Limestone | 48.13 |
| Attapulgite clay | 0.22 |
| Zinc sulfate monohydrate | 17.83 |
| Second Thickening agent | 0.17 |
| Preservative | 0.22 |
| Water | 33.43 |

Compound A had a too high viscosity for spray application and too low solids for desired drying rate. Compound B had acceptable viscosity for spray application but too low solids for the desired drying rate. Compound C has too low viscosity for spray application and too low solids for the desired drying rate. Compound D has the appropriate viscosity for spray application and achieved high solids for the desired drying rate.

The first 4 formulations were activated with the activator mixture at a ratio of 2:1 (joint compound mixture:activator mixture). The samples were applied and tested over wallboard at 45-mil thickness (2"×8"). Both forms of calcium sulfate hemihydrate alpha morphological form having rod-like (HYDROCAL B-base) and blocky cubic (HYDROCAL C-base) crystal microstructure were tested and display the benefits of the blocky cubic crystal microstructure form. Additionally, the calcium sulfate hemihydrate used had an average particle size of about 15 to about 20 microns, typically about 17 microns. The blocky cubic crystal microstructure form of calcium sulfate hemihydrate (for example HYDROCAL C-base) provided a low viscosity product with higher solids, promoting faster drying.

The spray trials were activated with an activator mixture at a ratio of 2:1 (Joint compound mixture:activator mixture). Samples were applied and tested over wallboard at 45-mil thickness (dimension 2"×8"). HYDROCAL C-Base provided a lower consistency product with higher solids, which promotes faster drying. The evaporation rate of water is theorized to be equivalent to a conventional drying type compound. (FIG. 7 shows the dryness curve from this example).

Example 3

An activator mixture of the invention (comprising calcium carbonate and zinc sulfate monohydrate) was compared to a commercially available zinc sulfate solution to determine the impact to viscosity of the activated compound. Table 9 shows the compositions. The joint compound mixture had a viscosity of 13,056 and 76% solids. The joint compound mixture consisted of 75.59 wt. % low consistency calcium hemihydrate (HYDROCAL C-base), 0.25 wt. % attapulgite clay, 0.17 wt. % thickening agent, 0.11 wt. % retarder, 0.57 wt. % chelating agent a, 0.20 wt. % chelating agent b, 0.21 wt. % preservative, and 23.00 wt. % water. The zinc sulfate activator mixture compound ("Activator mixture") consisted of 49.84 wt. % dolomitic limestone, 0.23 wt. % attapulgite clay, 18.46 wt. % zinc sulfate monohydrate, 0.17 wt. % thickening agent, 0.23 wt. % preservative, and 31.06 wt. % water.

TABLE 9

| Product | Zinc Sulfate Activator Compound | Zinc Sulfate 33% Solution |
| --- | --- | --- |
| Viscosity (cps) 75 rpm KU1030 spindle | 17,462 | 80 |
| Percent Solids (%) | 69 | 33 |
| Total Zinc Sulfate Amount (%) | 18 | 33 |
| Compound amount (g) | 250 | 300 |
| Activator amount (g) | 46 | 30 |
| Active zinc sulfate (%) | 3.3 | 3.3 |
| Viscosity of Joint Compound (cps) 75 rpm KU1030 spindle | 7,877 | 2,804 |
| Set Time (min) | 22 | 20 |
| Percent Viscosity Change (%) | −66 | −366 |

Figure 8:
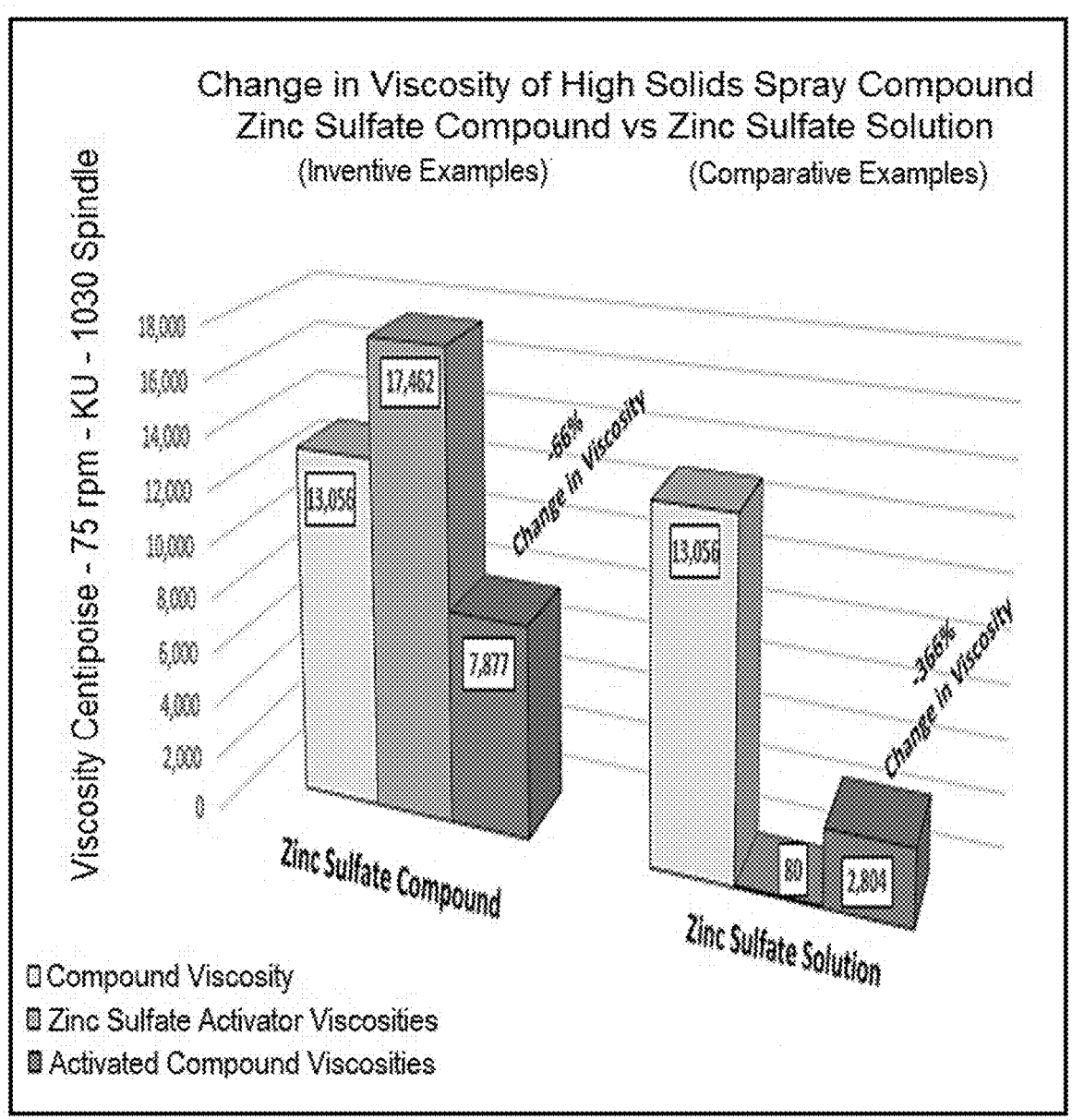
FIG. 8 shows the change in viscosity of high solids spray trial compounds (activator mixture compound v. solution) of an example of the present specification.

FIG. 8 shows the change in the viscosity for Example 3. The activator mixture (called Activator Compound in the figure) was compared to the Activator Solution and it showed that the Activator Solution reduced product viscosity by 366%. The 13,056 cps bar in the graph reflects the joint compound mixture's viscosity, the light gray bar reflects the viscosity of the zinc sulfate activator compound viscosity or the zinc sulfate activator solution viscosity, respectively. The dark gray bars reflect the viscosity of the joint compound once the joint compound mixture and activator mixture are mixed together.

This large reduction of viscosity could cause issues with the product consistency and sag once it is sprayed on the wall, while also slowing down the drying time. The Activator Mixture Compound resolves this issue by not modifying the viscosity of the joint compound, preventing sagging on the wall after it is sprayed, while still being pumpable for spray applications.

Clauses Describing Various Characteristics of Products of the Invention

Clause 1. A sprayable, ready-mixed setting-type joint compound comprising a blend of (A) a joint compound mixture comprising:

(a) joint compound mixture ingredients comprising in weight percent on a dry basis:

about 20 to about 99 wt. %, preferably about 50 to about 99 wt. %, more preferably about 75 to about 99 wt. %, calcium sulfate hemihydrate in an alpha morphological form having blocky cubic crystal microstructure with a D50 average particle size of about 15 to 50 microns, for example 15 to 20 microns or 20 to 50 microns, about 0-4 wt. % preferably about 0.05 to about 2 wt. %, more preferably about 0.1 to about 1 wt. % thickening agent, about 0-2 wt. % preferably about 0 to about 1 wt. %, more preferably about 0 to about 0.05 wt. % set retarder, about 0.05-5 wt. % preferably about 0.05 to about 2 wt. %, more preferably about 0.25 to about 2 wt. % chelating agent, wherein the chelating agent is selected from tetra sodium pyrophosphate or tetra potassium pyrophosphate, about 0-2 wt. % preferably about 0 to about 1 wt. %, more preferably about 0.05 to about 0.3 wt. % preservative, optionally about 0-5 wt. % preferably about 0.05 to about 2 wt. %, more preferably about 0.05 to about 1 wt. % second chelating agent, optionally about 0-80 wt. % preferably about 0 to about 50 wt. %, more preferably about 0 to about 25 wt. % filler, and optionally about 0-5 wt. % binder, and (b) joint compound mixture water, wherein weight ratio of the joint compound mixture ingredients to the joint compound mixture water is within a range of 9:1 to 3:2, preferably 5:1-3:2, more preferably 3:1-3:2, most preferably 3:1, and (B) an activator mixture, wherein the activator mixture comprises:

(a) activator mixture ingredients comprising in weight percent on a dry basis:

inert filler at about 0-95 wt. %, preferably 25-95 wt. %, more preferably 50-95 wt. % of the activator mixture ingredients, set accelerator at about 5-99 wt. %, preferably 5-75 wt. %, more preferably 5-50 wt. %, of the activator mixture ingredients, thickening agent at about 0-4 wt. %, preferably 0.05-2 wt. %, more preferably 0.1-1 wt. %, of the activator mixture ingredients, preservative at about 0-2 wt. %, preferably 0-1 wt. %, more preferably 0.05-0.3 wt. % of the activator mixture ingredients, and (b) activator mixture water, wherein weight ratio of the activator mixture ingredients to the activator mixture water is within a range of 9:1 to 3:2, preferably 5:1-3:2, more preferably 3:1-3:2, most preferably 2:1 wherein a weight ratio of joint compound mixture: activator mixture is 1:1 to 100:1, wherein the activator mixture viscosity is the same as the joint compound mixture viscosity plus or minus 50%, preferably plus or minus 20%, most preferably plus or minus 10%, wherein the joint compound mixture viscosity is between 2,500-28,000 cps, wherein the activator mixture viscosity is between 2,500-28,000 cps, wherein the joint compound viscosity is between 2,500-28,000 cps, and wherein the joint compound has about 55 to about 88 wt. % solids, wherein the joint compound mixture has about 55 to about 88 wt. % solids, wherein the activator mixture has about 55 to about 88 wt. % solids.

Clause 2. The joint compound of clause 1 wherein the inert filler comprises calcium carbonate at about 25 to 95 wt. % of the activator mixture ingredients.

Clause 3. The joint compound of clause 1 wherein the inert filler comprises calcium carbonate at about 50 to 95 wt. % of the activator mixture ingredients.

Clause 4. The joint compound of any preceding clause wherein the weight ratio of joint compound mixture:activator mixture is 1:1 to 10:1.

Clause 5. The joint compound of any preceding clause wherein the joint compound has about 69 to about 78 wt. % solids.

Clause 6. The joint compound of any of clauses 1, 2, 3 or 4 wherein the joint compound has about 72 to about 78 wt. % solids.

Clause 7. The joint compound of any preceding clause wherein the joint compound mixture has a viscosity of about 4,000-5,600 cps and the activator mixture has a viscosity of about 4,000-5,600 cps.

Clause 8. The joint compound of any preceding clause wherein the joint compound has a Vicat set-time of 23-39 minutes.

Clause 9. A system for making a joint compound comprising a joint compound mixture and an activator mixture, said joint compound mixture being mixable with the activator mixture;

(A) wherein the joint compound mixture comprises (a) joint compound mixture ingredients comprising in weight percent on a dry basis:

about 20 to about 99 wt. %, preferably about 50 to about 99 wt. %, more preferably about 75 to about 99 wt. %, calcium sulfate hemihydrate in an alpha morphological form having blocky cubic crystal microstructure with a D50 average particle size of about 15 to 50 microns, for example 15 to 20 microns or 20 to 50 microns, about 0-4 wt. % preferably about 0.05 to about 2 wt. %, more preferably about 0.1 to about 1 wt. % thickening agent, about 0-2 wt. % preferably about 0 to about 1 wt. %, more preferably about 0 to about 0.05 wt. % set retarder, about 0.05-5 wt. % preferably about 0.05 to about 2 wt. %, more preferably about 0.25 to about 2 wt. % chelating agent, wherein the chelating agent is selected from tetra sodium pyrophosphate or tetra potassium pyrophosphate, about 0-2 wt. % preferably about 0 to about 1 wt. %, more preferably about 0.05 to about 0.3 wt. % preservative, optionally about 0-5 wt. % preferably about 0.05 to about 2 wt. %, more preferably about 0.05 to about 1 wt. % second chelating agent, optionally about 0-80 wt. % preferably about 0 to about 50 wt. %, more preferably about 0 to about 25 wt. % filler, and optionally about 0-5 wt. % binder, and (b) joint compound mixture water, wherein weight ratio of the joint compound mixture ingredients to the joint compound mixture water is within a range of 9:1 to 3:2, and (B) wherein the activator mixture comprises:

(a) activator mixture ingredients comprising in weight percent on a dry basis:

inert filler at about 0-95 wt. %, preferably 25-95 wt. %, more preferably 50-95 wt. % of the activator mixture ingredients, set accelerator at about 5-99 wt. %, preferably 5-75 wt. %, more preferably 5-50 wt. % of the activator mixture ingredients, thickening agent at about 0-4 wt. %, preferably 0.05-2 wt. %, more preferably 0.1-1 wt. % of the activator mixture ingredients, preservative at about 0-2 wt. %, preferably 0-1 wt. %, more preferably 0.05-0.3 wt. % of the activator mixture ingredients, and (b) activator mixture water, wherein weight ratio of the activator mixture ingredients to the activator mixture water is within a range of 9:1 to 3:2, preferably 5:1-3:2, more preferably 3:1-3:2, most preferably 2:1 wherein a weight ratio of joint compound mixture:activator mixture is 1:1 to 100:1, wherein the activator mixture viscosity is the same as the joint compound mixture viscosity plus or minus 50%, preferably plus or minus 20%, most preferably plus or minus 10%, wherein the joint compound mixture viscosity is between 2,500-28,000 cps, wherein the activator mixture viscosity is between 2,500-28,000 cps, wherein the joint compound viscosity is between 2,500-28,000 cps, and wherein the joint compound has about 55 to about 88 wt. % solids, wherein the joint compound mixture has about 55 to about 88 wt. % solids, wherein the activator mixture has about 55 to about 88 wt. % solids.

Clause 10. A system for making the joint compound of any of clauses 1-8.

Clause 11. The system of any of clauses 9, or 10 wherein the joint compound consists essentially of the joint compound mixture and the activator mixture.

Clause 12. The system of any of clauses 9, 10, or 11, wherein the joint compound mixture consists essentially of the joint compound mixture ingredients and joint compound mixture water.

Clause 13. The system of any of clauses 9, 10, 11, or 12 wherein the activator mixture consists essentially of the activator mixture ingredients and activator mixture water.

Clause 14. A method of dispersing joint compound comprising mixing a joint compound mixture and an activator mixture and spraying the joint compound through a nozzle on a spray gun, (A) wherein the joint compound mixture comprises (a) joint compound mixture ingredients comprising in weight percent on a dry basis:

about 20 to about 99 wt. %, preferably about 50 to about 99 wt. %, more preferably about 75 to about 99 wt. %, calcium sulfate hemihydrate in an alpha morphological form having blocky cubic crystal microstructure with a D50 average particle size of about 15 to 50 microns, for example 15 to 20 microns or 20 to 50 microns, about 0-4 wt. % preferably about 0.05 to about 2 wt. %, more preferably about 0.1 to about 1 wt. % thickening agent, about 0-2 wt. % preferably about 0 to about 1 wt. %, more preferably about 0 to about 0.05 wt. % set retarder, about 0.05-5 wt. % preferably about 0.05 to about 2 wt. %, more preferably about 0.25 to about 2 wt. % chelating agent, wherein the chelating agent is selected from tetra sodium pyrophosphate or tetra potassium pyrophosphate, about 0-2 wt. % preferably about 0 to about 1 wt. %, more preferably about 0.05 to about 0.3 wt. % preservative, optionally about 0-5 wt. % preferably about 0.05 to about 2 wt. %, more preferably about 0.05 to about 1 wt. % second chelating agent, optionally about 0-80 wt. % preferably about 0 to about 50 wt. %, more preferably about 0 to about 25 wt. % filler, and optionally about 0-5 wt. % binder, and (b) joint compound mixture water, wherein weight ratio of the joint compound mixture ingredients to the water is within a range of 9:1 to 3:2, and (B) wherein the activator mixture comprises:

(a) activator mixture ingredients comprising in weight percent on a dry basis:

inert filler at about 0-95 wt. %, preferably 25-95 wt %, more preferably 50-95 wt. % of the activator mixture ingredients, set accelerator at about 5-99 wt. %, preferably 5-75 wt. %, more preferably 5-50 wt. % of the activator mixture ingredients, thickening agent at about 0-4 wt. %, preferably 0.05-2 wt. %, more preferably 0.1-1 wt. % of the activator mixture ingredients, preservative at about 0-2 wt. %, preferably 0-1 wt. %, more preferably 0.05-0.3 wt. % of the activator mixture ingredients, and (b) activator mixture water, wherein weight ratio of the activator mixture ingredients to the activator mixture water is within a range of 9:1 to 3:2, preferably 5:1-3:2, more preferably 3:1-3:2, most preferably 2:1, wherein a weight ratio of joint compound mixture:activator mixture is 1:1 to 100:1, wherein the activator mixture viscosity is the same as the joint compound mixture viscosity plus or minus 50%, preferably plus or minus 20%, most preferably plus or minus 10%, wherein the joint compound mixture viscosity is between 2,500-28,000 cps, wherein the activator mixture viscosity is between 2,500-28,000 cps, wherein the joint compound viscosity is between 2,500-28,000 cps, and wherein the joint compound has about 55 to about 88 wt. % solids, wherein the joint compound mixture has about 55 to about 88 wt. % solids, wherein the activator mixture has about 55 to about 88 wt. % solids.

Clause 15. A method of dispersing the joint compound of any of clauses 1-8.

Clause 16. The method of any of clauses 14 or 15 wherein the joint compound mixture has a viscosity of about 4,000-

5,600 cps ratio of joint compound mixture:activator mixture is 1:1 to 10:1 and the activator mixture has a viscosity of about 4,000-5,600 cps.

Clause 17. The compound of clause 1, further comprising a custom colorant.

Clause 18. The compound of clause 1, wherein the joint compound mixture further comprises a colorant, wherein the colorant is a different color from the color of the activator mixture.

Clause 19. The compound of clause 1, wherein the activator mixture further comprises a colorant, wherein the colorant is a different color from the color of the joint compound mixture.

In the examples herein, as mentioned above, percentages of compositions or product formulae are in weight percentages, unless otherwise expressly stated. The reported measurements also in approximate amounts unless expressly stated, for example, approximate percentages, weights, temperatures, distances or other properties.

In the present specification all percentages, ratios and proportions herein are by weight, unless otherwise specified. In the present specification a dry basis means a water free basis. In the present specification a wet basis means a water inclusive basis. Water inclusive basis means water and the other ingredients basis.

While particular versions of the invention have been shown and described, it will be appreciated by those skilled in the art that changes and modifications may be made thereto without departing from the invention in its broader aspects and as set forth in the following claims.

What is claimed is:

1. A sprayable ready-mixed setting-type joint compound comprising a blend of
(A) a joint compound mixture comprising:
   (a) joint compound mixture ingredients comprising in weight percent on a dry basis:
      about 75 to about 99 wt. % calcium sulfate hemihydrate in an alpha morphological form having blocky cubic crystal microstructure with a D50 average particle size of about 15 to 50 microns, and
      said calcium sulfate hemihydrate having a consistency of 31-36 cc water per 100 g said calcium sulfate hemihydrate,
      about 0-4 wt. % thickening agent,
      about 0-2 wt. % set retarder,
      about 0.05-5 wt. % chelating agent, wherein the chelating agent is selected from tetra sodium pyrophosphate or tetra potassium pyrophosphate,
      about 0-2 wt. % preservative,
      optionally about 0-5 wt. % second chelating agent,
      optionally about 0-80 wt. % filler, and
      optionally about 0-5 wt. % binder, and
   (b) joint compound mixture water, wherein weight ratio of the joint compound mixture ingredients to the joint compound mixture water is within a range of 3:1 to 1.5, and
(B) an activator mixture, wherein the activator mixture comprises:
   (a) activator mixture ingredients comprising in weight percent on a dry basis:
      inert filler, wherein the inert filler comprises calcium carbonate at about 50 to 95 wt. % of the activator mixture ingredients,
      set accelerator at 5-50 wt. % of the activator mixture ingredients, thickening agent at about 0-4 wt. % of the activator mixture ingredients,
   preservative at about 0-2 wt. % of the activator mixture ingredients, and
   (b) activator mixture water, wherein weight ratio of the activator mixture ingredients to the activator mixture water is within a range of 3:1 to 1.5:1,
wherein the composition has an absence of Portland cement,
wherein a weight ratio of joint compound mixture:activator mixture is 1:1 to 10:1,
wherein the activator mixture viscosity is the same as the joint compound mixture viscosity plus or minus 20%,
wherein the joint compound mixture viscosity is 2,500-5600 cps,
wherein the activator mixture viscosity is 2,500-5600 cps,
wherein the joint compound viscosity is between 2,500-5600 cps, and
wherein the joint compound mixture has about 60 to about 88 wt. % solids,
wherein the activator mixture has about 60 to about 88 wt. % solids, and
wherein the sprayable ready-mixed setting-type joint compound has a spray viscosity which is substantially the same as the joint compound mixture viscosity.

2. The joint compound of claim 1, wherein the set accelerator comprises zinc sulfate and the accelerator is 26.8-50 wt. % of the activator mixture ingredients.

3. The joint compound of claim 1, wherein the joint compound has about 69 to about 78 wt. % solids, having an absence of hydraulic cements.

4. The joint compound of claim 1, wherein the joint compound has about 72 to about 78 wt. % solids.

5. The joint compound of claim 1,
wherein the joint compound mixture has a viscosity of 2,500-4005 cps.

6. The joint compound of claim 1, wherein the joint compound has a Vicat set-time of 23-39 minutes.

7. A method of dispersing the sprayable ready-mixed setting-type joint compound of claim 1 comprising
   mixing a joint compound mixture and an activator mixture to obtain the sprayable ready-mixed setting-type joint compound and
   spraying the sprayable ready-mixed setting-type joint compound through a nozzle on a spray gun,
   (A) wherein the joint compound mixture comprises
   (a) joint compound mixture ingredients comprising in weight percent on a dry basis:
      about 75 to about 99 wt. % calcium sulfate hemihydrate in an alpha morphological form having blocky cubic crystal microstructure with a D50 average particle size of about 15 to 50 microns, and
      said calcium sulfate hemihydrate having a consistency of 31-36 cc water per 100 g said calcium sulfate hemihydrate,
      about 0-4 wt. % thickening agent,
      about 0-2 wt. % set retarder,
      about 0.05-5 wt. % chelating agent, wherein the chelating agent is selected from tetra sodium pyrophosphate or tetra potassium pyrophosphate,
      about 0-2 wt. % preservative,
      optionally about 0-5 wt. % second chelating agent,
      optionally about 0-80 wt. % filler, and
      optionally about 0-5 wt. % binder, and (b) joint compound mixture water, wherein weight ratio of the joint compound mixture ingredients to the joint compound mixture water is within a range of 3:1 to 1.5, and (B) wherein the activator mixture comprises:

(a) activator mixture ingredients comprising in weight percent on a dry basis:

inert filler wherein the inert filler comprises calcium carbonate at about 50 to 95 wt. % of the activator mixture ingredients, set accelerator at about 50 wt. % of the activator mixture ingredients, thickening agent at about 0-4 wt. % of the activator mixture ingredients, preservative at about 0-2 wt. % of the activator mixture ingredients, and (b) activator mixture water, wherein weight ratio of the activator mixture ingredients to the activator mixture water is within a range of 3:1 to 1.5:1, wherein the composition has an absence of Portland cement, wherein a weight ratio of joint compound mixture:activator mixture is 1:1 to 10:1 wherein the activator mixture viscosity is the same as the joint compound mixture viscosity plus or minus 20%, wherein the joint compound mixture viscosity is 2,500-5600 cps, wherein the activator mixture viscosity is 2,500-5600 cps, wherein the joint compound viscosity is 2,500-5600 cps, and wherein the joint compound has about 60 to about 88 wt. % solids, wherein the joint compound mixture has about 60 to about 88 wt. % solids, wherein the activator mixture has about 60 to about 88 wt. % solids, and wherein the sprayable ready-mixed setting-type joint compound has a spray viscosity which is substantially the same as the joint compound mixture viscosity.

8. The method of claim 7, wherein the joint compound mixture has a viscosity of about 4,000-5,600 cps, a ratio of joint compound mixture:activator mixture is 1:1 to 10:1 and the activator mixture has a viscosity of about 4,000-5,600 cps.

9. The joint compound of claim 1, further comprising a custom colorant.

10. The joint compound of claim 1, wherein the joint compound mixture further comprises a colorant, wherein the colorant is a different color from the color of the activator mixture.

11. The joint compound of claim 1, wherein the activator mixture further comprises a colorant, wherein the colorant is a different color from the color of the joint compound mixture.

12. The joint compound of claim 1, wherein the calcium sulfate hemihydrate D50 average particle size is 15 to 20 microns.

13. The joint compound of claim 1, wherein the calcium sulfate hemihydrate D50 average particle size is 20 to 50 microns.

14. The joint compound of claim 1, wherein the joint compound mixture viscosity is 2,500-4000 cps, wherein the activator mixture viscosity is 2,500-4000 cps, and wherein the joint compound viscosity is between 2,500-4000 cps.

*     *     *     *     *